United States Patent
Nahmias et al.

(10) Patent No.: US 8,216,660 B2
(45) Date of Patent: Jul. 10, 2012

(54) HALOGEN AND PLASTICIZER FREE PERMEABLE LAMINATE

(75) Inventors: A. Michael Nahmias, Wakefield, RI (US); Richard Pierce, Plymouth, MA (US); Kevin J. Souza, Dighton, MA (US); James H. Wyner, Chestnut Hill, MA (US); Marilyn Geller, Brooklyn, NY (US); Daniel Wyner, North Scituate, RI (US)

(73) Assignee: SHAWMUT Corporation, West Bridgewater, MA (US)

( * ) Notice: Subject to any disclaimer, the term of this patent is extended or adjusted under 35 U.S.C. 154(b) by 1613 days.

(21) Appl. No.: 11/121,834

(22) Filed: May 4, 2005

(65) Prior Publication Data
US 2006/0252329 A1 Nov. 9, 2006

(51) Int. Cl.
*B32B 3/10* (2006.01)
*B32B 27/12* (2006.01)
(52) U.S. Cl. ............... 428/131; 428/137; 428/904.4; 442/394
(58) Field of Classification Search ............ 442/394, 442/398; 428/131–133, 137
See application file for complete search history.

(56) References Cited

U.S. PATENT DOCUMENTS

| | | |
|---|---|---|
| 3,546,001 A | 12/1970 | Giannone et al. |
| 3,616,146 A | 10/1971 | Gabet |
| 3,637,458 A | 1/1972 | Parrish |
| 3,703,197 A | 11/1972 | Samler et al. |
| 4,017,493 A | 4/1977 | Ferment et al. |
| 4,018,957 A | 4/1977 | Werner et al. |
| 4,039,709 A | 8/1977 | Newman |
| 4,172,169 A * | 10/1979 | Mawson et al. ......... 428/159 |

(Continued)

FOREIGN PATENT DOCUMENTS

CA 2187634 6/1994

(Continued)

OTHER PUBLICATIONS

Federal Specification CC-W-408C, Wall Covering, Vinyl-Coated, Jan. 14, 1994, 22 pages.

(Continued)

*Primary Examiner* — Lynda Salvatore
(74) *Attorney, Agent, or Firm* — Nutter McClennen & Fish LLP; George A. Xixis

(57) ABSTRACT

The invention provides breathable laminated articles, preferably free from harmful halogens and plasticizers, which can be constructed and arranged to be usable for any application, such as wallcoverings, where breathability and being free from harmful halogens and/or plasticizers is advantageous. For example, the breathable laminated article can be made from a non-woven, breathable backing layer of material, the backing layer having a plurality of microprojections on a first side, coupled along the first side to a top layer, where the top layer may or may not be breathable, to form an assembly. This assembly has at least one variation formed in the level of the surface of the first side of the first layer, wherein the variation in level is formed such that the microprojections penetrate at least a portion of the top layer to form microapertures that improve the breathability of the top layer. In another example, the breathable laminated article can be made from a non-woven, breathable backing layer laminated to a breathable, essentially halogen free, and essentially plasticizer free top layer. Optionally, the top layer can be have at least one variation in level formed on its top surface, such as by embossing. In addition, a layer of printing optionally can be disposed between the backing and top layers.

47 Claims, 16 Drawing Sheets

U.S. PATENT DOCUMENTS

| | | | |
|---|---|---|---|
| 4,341,581 A | 7/1982 | Civardi et al. | |
| 4,367,327 A | 1/1983 | Holker et al. | |
| 4,409,275 A | 10/1983 | Samowich | |
| 4,427,731 A | 1/1984 | Gibson | |
| 4,433,017 A | 2/1984 | Goto et al. | |
| 4,507,430 A | 3/1985 | Shimada et al. | |
| 4,515,846 A | 5/1985 | McKinney et al. | |
| 4,600,648 A | 7/1986 | Yazaki et al. | |
| 4,650,704 A | 3/1987 | Rothenberg | |
| 4,746,684 A | 5/1988 | Kuriyama et al. | |
| 4,769,265 A | 9/1988 | Coburn, Jr. | |
| 4,939,036 A | 7/1990 | Reith | |
| 4,975,135 A | 12/1990 | Lowe | |
| 5,036,134 A | 7/1991 | Kunz et al. | |
| 5,087,311 A | 2/1992 | Elliott et al. | |
| 5,173,300 A | 12/1992 | Burleigh et al. | |
| 5,208,313 A | 5/1993 | Krishnan | |
| 5,209,969 A | 5/1993 | Crowther | |
| 5,229,207 A | 7/1993 | Paquette et al. | |
| 5,258,226 A * | 11/1993 | Nakagawa et al. | 428/339 |
| 5,262,444 A | 11/1993 | Rusincovitch et al. | |
| 5,294,386 A | 3/1994 | Roth et al. | |
| 5,643,375 A | 7/1997 | Wilfong et al. | |
| 5,660,918 A | 8/1997 | Dutta | |
| 5,698,477 A | 12/1997 | Iwamaru et al. | |
| 5,800,898 A | 9/1998 | Gerry | |
| 5,800,928 A * | 9/1998 | Fischer et al. | 428/500 |
| 5,840,812 A | 11/1998 | Schultze | |
| 5,851,457 A | 12/1998 | Peterson et al. | |
| 5,858,514 A | 1/1999 | Bowers | |
| 5,866,220 A | 2/1999 | Rusincovitch et al. | |
| 5,874,140 A | 2/1999 | Wyner et al. | |
| 5,876,551 A * | 3/1999 | Jackson | 156/307.4 |
| 5,891,547 A | 4/1999 | Lawless | |
| 5,981,058 A | 11/1999 | Shih et al. | |
| 6,187,424 B1 | 2/2001 | Kjellqvist et al. | |
| 6,214,453 B1 | 4/2001 | Kano | |
| 6,238,789 B1 | 5/2001 | Jackson | |
| 6,299,715 B1 | 10/2001 | Langsdorf et al. | |
| 6,337,104 B1 | 1/2002 | Draxo et al. | |
| 6,495,206 B1 | 12/2002 | Desai | |
| 6,511,927 B1 | 1/2003 | Ellis et al. | |
| 6,797,102 B2 | 9/2004 | Garcia et al. | |
| 6,833,335 B2 | 12/2004 | DeMott et al. | |
| 6,855,424 B1 | 2/2005 | Thomas et al. | |
| 6,946,182 B1 * | 9/2005 | Allgeuer et al. | 428/92 |
| 7,381,447 B2 | 6/2008 | Hoersch | |
| 7,402,223 B2 | 7/2008 | Marks, III et al. | |
| 2001/0046581 A1 | 11/2001 | Brumbelow et al. | |
| 2002/0061380 A1 | 5/2002 | Corpus et al. | |
| 2002/0136862 A1 | 9/2002 | Dong et al. | |
| 2002/0160182 A1 | 10/2002 | Lorah et al. | |
| 2002/0168503 A1 | 11/2002 | Dong et al. | |
| 2002/0187175 A1 | 12/2002 | Petrea et al. | |
| 2003/0039806 A1 | 2/2003 | Weder | |
| 2004/0029467 A1 * | 2/2004 | Lacroix | 442/76 |
| 2004/0106346 A1 | 6/2004 | Zafiroglu | |
| 2004/0259448 A1 | 12/2004 | Nahmias et al. | |
| 2004/0265565 A1 * | 12/2004 | Fischer et al. | 428/317.9 |
| 2005/0003141 A1 | 1/2005 | Zafiroglu | |
| 2005/0014431 A1 * | 1/2005 | Carmody et al. | 442/76 |
| 2009/0068412 A1 | 3/2009 | Nahmias et al. | |

FOREIGN PATENT DOCUMENTS

| | | |
|---|---|---|
| CA | 2227794 | 3/1997 |
| DE | 3932726 | 4/1991 |
| DE | 19530508 | 2/1997 |
| EP | 0463835 A2 | 6/1991 |
| EP | 0463835 B1 | 6/1991 |
| WO | WO 93/16123 | 8/1993 |
| WO | WO 94/02526 | 2/1994 |
| WO | WO 94/15772 | 7/1994 |
| WO | WO 95/23179 | 8/1995 |
| WO | WO 99/54134 | 10/1999 |
| WO | WO 01/05588 | 1/2001 |

OTHER PUBLICATIONS

"Mold, Cause, Effect and Response; A study of Wallcovering Products", Downloaded from CFFA website www.chemicalfabricsandfilm.com, 77 pages.

Curprinol Trade Polyurethane Varnish, Safety Data Sheet SDSCT607 (Mar. 2006).

International Search Report, from corresponding PCT/US08/76222, dated Dec. 2, 2008.

KrystalFlex, "Optical Aliphatic Films—Thermoplastic Polyurethane," Huntsman (Jan. 2008).

Laromer® LR 8949, Coatings Raw Materials, Provisional Technical Information, BASF Form #204 (Jan. 1999).

Luphen* D 200A, Safety Data Sheet, BASF (Feb. 14, 2006).

Luphen® D 207 E, Adhesive Raw Materials, Technical Information, BASF (Mar. 2000).

Luphen* D 259 U, Safety Data Sheet, BASF (Mar. 13, 2006).

Luphen® D DS 3528, Adhesive Raw Materials, Technical Information, BASF (Oct. 1999).

Northwest Coatings, Technical Bulletin UV/EB Adhesives & Coatings, "MEK Double Rub Test Method for Cure of UV Coatings," TB-08.

Petrie, EM, Handbook of Adhesives and Seafants, McGraw-Hill, Ch. 2, p. 82 (2000).

Printers' National Environmental Assistance Center, Print Process Descriptions, Flexography, www.pneac.org/printprocesses/flexography.

Rohm and Haas ROBOND L-330 Material Safety Data Sheet (Mar. 7, 2007).

Saunders and Frisch, Polyurethanes: Chemistry and Technology, Interscience Publishers (1964).

Solucote® 6629 Product Pamphlet, DSM NeoSol, Inc., Providence, RI (Revised May 2008).

Solucote® 13086 Product Pamphlet, DSM NeoSol, Inc., Providence, RI (Revised Mar. 2008).

Stahl Coatings & Leather Finish, Automotive Company Profile, Permuthane Division, Stahl Europe by (Jan. 28, 2008).

Stahl SU-13-550 Material Safety Data Sheet (Aug. 31, 2005).

Touchstone Research Laboratory, Paint and Coatings Laboratory, Solvent Resistance Rub Test—ASTM D4752 (2004).

Wegman, R. F., "Surface Preparation Techniques for adhesive Bonding," William Andrew Publishing/Noyes, Ch. 8, p. 113 (1989).

* cited by examiner

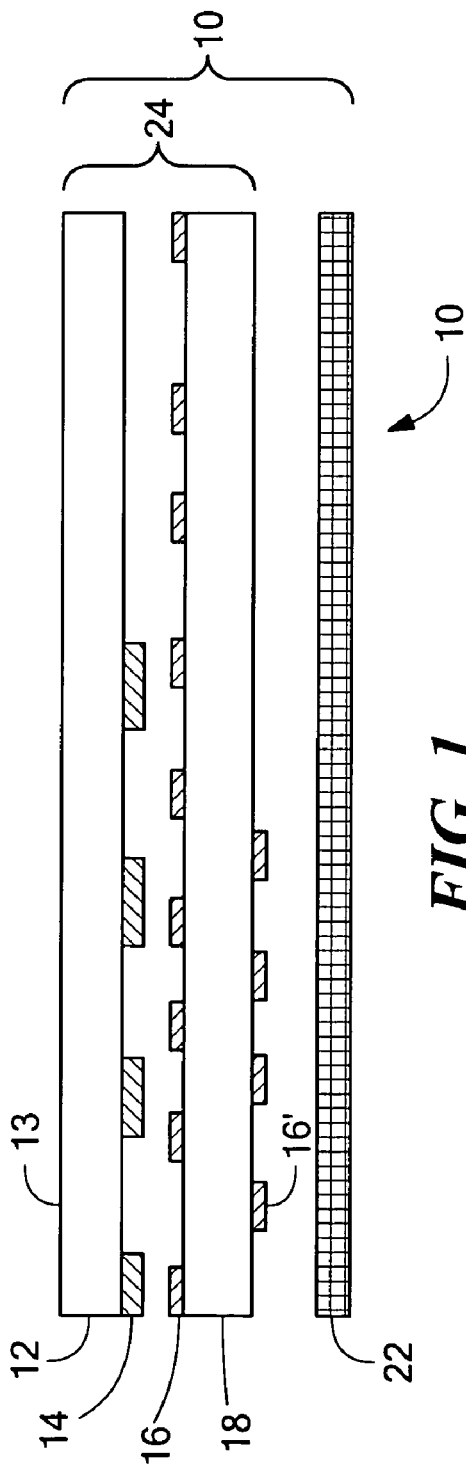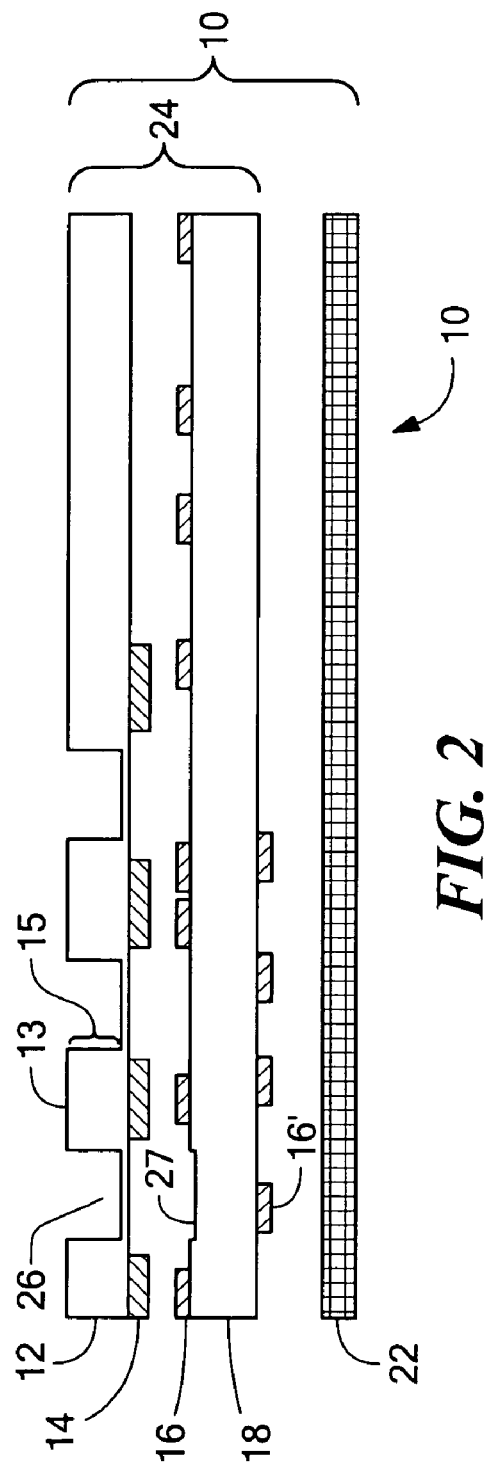

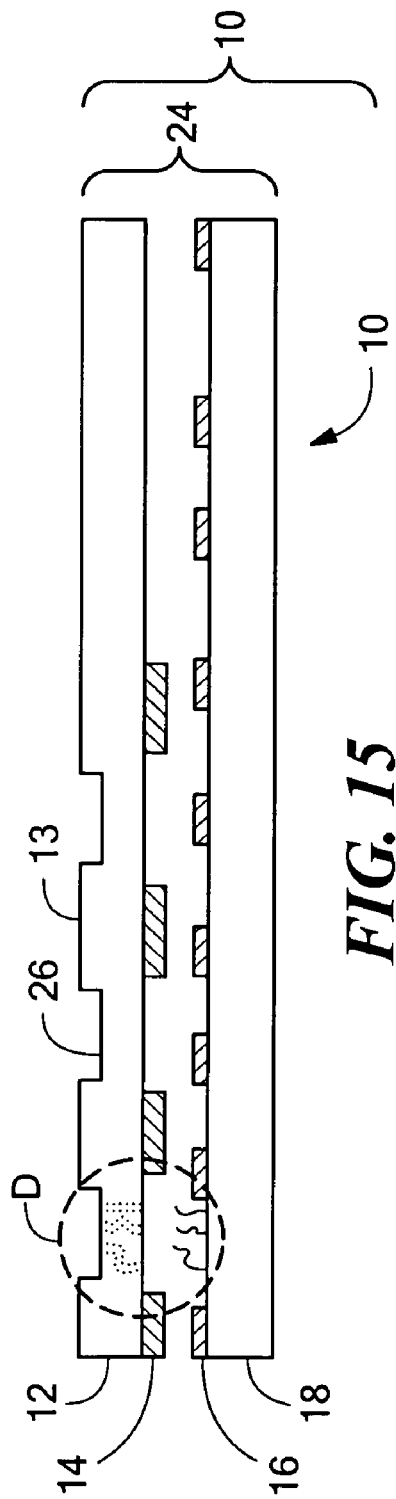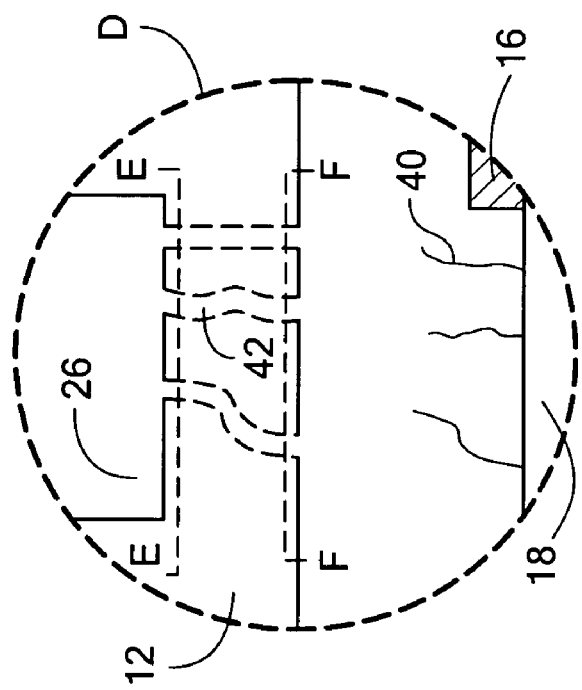

HALOGEN AND PLASTICIZER FREE PERMEABLE LAMINATE

CROSS-REFERENCE TO RELATED APPLICATIONS

Not applicable

STATEMENT REGARDING FEDERALLY SPONSORED RESEARCH

Not applicable

FIELD OF THE INVENTION

Embodiments of the invention generally relate to breathable laminates, including breathable decorative wallcoverings, and methods of making breathable laminates. More particularly, the invention relates to breathable laminates that can be free of harmful halogens and/or plasticizers.

BACKGROUND OF THE INVENTION

Breathable laminates have been used in a variety of applications, and have advantageously been used for wallcoverings. Being "breathable" (also referred to as permeable) refers to the ability of an article or object (e.g., a material) to allow air and/or moisture vapor to be transmitted therethrough, whether the article or material is permeable or semipermeable, including but not limited to the ability to selectively transmit, conduct, or transport gases, mists and vapors of chemicals, and mixtures thereof. Breathable wallcoverings can, for example, be used in relatively humid environments such as bathrooms, kitchens, hospitals, etc., to help prevent or reduce growth of mold and mildew. Wallcoverings include virtually any type of coverings applied to walls for decoration, scrubbability and/or to hide imperfections.

Polyvinyl chloride (PVC), also referred to as vinyl, is commonly used in breathable wallcoverings and many other articles because it is inexpensive. PVC is a thermoset and thus rigid. Thus, addition of a softener, such as a plasticizer (e.g., di-n-octyl phthalate (DNOP), di(2-ethylhexyl) phthalate (DEHP), etc.) is needed to enable PVC to become less rigid. The more the flexibility desired (e.g., in applications such as wall coverings, household articles like shower curtains, medical tubing, etc.), the greater the quantity of plasticizer that must be added to the PVC. Additives to PVC, such as plasticizers, can comprise up to 60-80% of the total weight of a PVC product. Both PVC and its plasticizer, however, have disadvantages and harmful problems associated with their use, and these issues are magnified as the quantity of PVC and/or plasticizer increases.

One problem is that the additives to PVC do not always stay bound to the PVC. Additives can be lost to the air, washed out, consumed by microbes, and/or pass into other materials by direct contact. For example, depending on the temperature, PVC can give off chlorine, a gas that is generally harmful to humans. Stabilizers can be added to the PVC in an attempt to reduce this, but the stabilizers themselves can be consumed. In addition, PVC is not breathable and, as it ages, can emit gases (e.g., chlorine) and can be subject to cracking. Over time, the chlorine and/or plasticizer can leach out, leaving a brittle shell that shrinks and cracks. Further, at moderately high temperatures (e.g., heat from the sun, around 130-140 degrees Fahrenheit (F)), PVC can leak hydrochloric acid (HCL). This can cause yellowing of an article (e.g., a wallcovering) in which the PVC is used. PVC thus does not have a good fade resistance. Furthermore, when chlorine is "liberated" from the PVC, it can cause white PVC to turn black.

Still another issue is that although PVC by itself doesn't burn easily, many of its phthalate-based plasticizers do. Further, because phthalate molecules are not chemically bound to the polymer where they are used as plasticizers, a significant migration of phthalate into the surrounding environment and/or other materials is possible. This is problematic because phthalates have been found to be harmful. For example, the U.S. Department of Health and Human Services National Toxicology Program classifies DEHP as "reasonably anticipated to be a human carcinogen," and the European Union has determined that DEHP is toxic to reproduction and is banning its used in applications such as toys. In addition, although less is known about the plasticizer DNOP, DNOP still has been found to be a toxin in some situations and, like other phthalates, has been found to be harmful to some populations, such as pregnant women and individuals with respiratory disorders. DNOP also has been found to be harmful to the environment and its ecosystems.

For over thirty years, there has been a concern about excessive amounts of both vinyl chloride and PVC and their plasticizers present at excessive levels in public buildings where frequent washing and disinfecting are necessary, such as hospitals, nursing homes and office buildings. As detection methods have improved, easily measurable quantities of harmful materials such as chlorine gas and HCL have been documented in the air of structures in which PVC articles, especially laminates and wallcoverings, have been installed. Health care professionals have recognized that PVC and its plasticizers present significant indoor air quality issues.

Despite the health issues, cracking, and fading that can occur when PVC is used, there has been resistance to replacing PVC, especially when used in wallcoverings, because of the properties of PVC, including low cost, durability, scrubbability, and fire resistance.

SUMMARY OF THE INVENTION

At least some of the embodiments of the invention help to overcome some of the disadvantages of PVC, while providing a substitute that provides similar advantages. At least some embodiments provide a halogen-free, low pollution, durable, scrubbable, breathable commercial wallcovering product, having little to no emissions. The embodiments can include, for example, a polyurethane based design, a polyetheresteramide block copolymer, and/or a poly ether block amide (PEBA) based blend.

The embodiments of the invention provide a number of benefits. These benefits include improved breathability, good embossing characteristics, good durability, and resistance to tearing.

In one embodiment, the invention provides a breathable laminated article, comprising a first layer and a second layer. The first layer includes a first layer of a first material, and the first layer has first and second sides. The second layer has first and second sides and comprises a substantially breathable material having a plurality of micro-projections along at least a portion of its first side. The second layer is laminated along its first side to the second side of the first layer. The breathable laminated article is embossed along at least a portion of the first side of the first layer, the embossing penetrating the first layer to a degree sufficient to cause at least a portion of the plurality of microprojections to penetrate at least a portion of the first layer enough to form a respective plurality of microapertures in at least a portion of the first layer.

The microapertures can penetrate at least a portion of the first layer to a degree sufficient to improve the breathability of the first layer as compared to the breathability of the first layer before the microapertures are formed therein. The second material can be selected such that at least one of the size and quantity of its microprojections increases the breathability of the first layer as compared to the breathability of the first layer before the microapertures are formed in the first layer. For example, the second material can comprise comprises a non-woven material comprising a plurality of fibers, at least some of which project from the second side to form the microprojections.

The first material can comprise a film that is essentially free of at least one of a plasticizer and a halogen, such as at least one of polyolefin; polylactide; aliphatic polyurethane; aromatic polyurethane; ether or ester and blends therein; polyurethane blended with ether or ester; poly ether block amide (PEBA); polyetheresteramide block copolymer; poly ether block amide (PEBA) blended with at least one of polyethylene, acid modified poly ethylene, maleic anhydride modified polyethylene, and polyethylene produced by a metallocene process; blends of the polyether block amide blends with the polyurethane blends; PEBA; a blend of PEBA with at least one of ethyl acrylic, methyl acrylic and ethyl methyl acrylic copolymers of acrylic acid and polyethylene; an olefin including ethylene, polyethylene, polypropylene, and polybutene; and copolymers and terpolymers of polypropylene, ethylene, or butene-1.

A third layer can be disposed between the second side of the first layer and the first side of the second layer, the third layer comprising a printed pattern. The pattern can be printed such that it is either (a) reverse printed on the second side of the first layer or (b) printed on the first side of the second layer. The laminated article can be constructed and arranged to be usable as a wall covering.

In another embodiment, the invention provides a laminated article (which can, for example, be constructed and arranged to be usable as a breathable wallcovering), comprising first and second layers. The first layer comprises a breathable, substantially translucent, essentially halogen-free, and essentially plasticizer-free material, the first layer having first and second sides. The second layer is laminated to the second side of the first layer, the second layer comprising a substantially opaque, breathable, non-woven material having first and second sides. The third layer can be disposed between the second side of the first layer and the first side of the second layer, the third layer comprising a printed pattern, wherein the printed pattern is printed such that it is either reverse printed on the second side of the first layer or printed on the first side of the second layer.

A fourth layer can be disposed between the second side of the first layer and the first side of the second layer, the fourth layer comprising an adhesive, which can be applied in a discontinuous pattern. A fifth layer can be laminated (using, for example, a discontinuous layer of adhesive) to the second side of the second layer, the fifth layer having first and second sides, the first side of the fifth layer being coupled to the second side of the second layer, the fifth layer comprising a web material. The laminated article can be embossed along the first side of the first layer.

The first layer can comprise, for example 20-100% by weight, of at least one of aliphatic polyurethane; polylactide; aromatic polyurethane; ether or ester and blends therein; polyurethane blended with ether or ester; poly ether block amide; polyetheresteramide block copolymer; poly ether block amide (PEBA) blended with at least one of polyethylene, acid modified poly ethylene, maleic anhydride modified polyethylene, and polyethylene produced by a metallocene process; blends of the polyether block amide blends with the polyurethane blends; PEBA; a blend of PEBA with at least one of ethyl acrylic, methyl acrylic and ethyl methyl acrylic copolymers of acrylic acid and polyethylene; an olefin including ethylene, polyethylene, polypropylene, and polybutene; and copolymers and terpolymers of polypropylene, ethylene, butene-1 or polylactide.

In a further embodiment, the invention provides a method for increasing the breathability of a first material. A first layer of the first material is provided, the first layer having first and second sides. A second layer of a second material is laminated to the first layer, the second material having first and second sides and comprising a plurality of micro-projections on its first side, wherein the second layer is laminated along its first side to the second side of the first layer. The first side of the first layer is embossed along at least a portion thereof.

The embossing can be constructed and arranged to cause at least a portion of the plurality of micro-projections to penetrate at least a portion of the first layer. For example, after embossing, a plurality of microapertures can be formed in at least a portion of the first layer.

In another embodiment, the invention provides a method for making a breathable wallcovering. A first layer is provided, the first layer a breathable, essentially halogen-free, and essentially plasticizer-free material, the first layer having first and second sides. A second layer is laminated to the first layer, the second layer comprising a breathable, non-woven material having first and second sides.

The first side of the first layer can be embossed. A third layer can be provided to the breathable wallcovering, the third layer comprising at least one of (a) a printed pattern disposed between the second side of the first layer and the first side of the second layer; and (b) a web material coupled to the second side of the second layer.

Details relating to these and other embodiments of the invention are described more fully herein.

BRIEF DESCRIPTION OF THE DRAWINGS

The advantages and aspects of the present invention will be more fully understood in conjunction with the following detailed description and accompanying drawings, wherein:

FIG. 1 is an exploded cross sectional view of a laminate in accordance with a first embodiment of the invention;

FIG. 2 is an exploded cross sectional view of a laminate in accordance with a second embodiment of the invention;

FIG. 15 is an exploded cross sectional view of the laminate of FIG. 12 after an embossing process;

FIG. 16 is an enlarged view of section D of FIG. 15;

The figures are not to scale, emphasis instead being on illustrating the principles of the invention. In the figures, like reference numbers indicate like elements.

DETAILED DESCRIPTION

In the following description, the embodiments of the invention are described in connection with a wallcovering application, but that application is not limiting. Those of skill in the art will appreciate that the embodiments of the invention can be applied, adapted, and/or used in virtually any field or use where breathability, having reductions of halogens and/or plasticizers, and/or being free of halogens and/or plasticizers is advantageous, including, but not limited to:

Household goods (e.g., wall coverings, wall borders, wall décor and appliqués, flooring, furniture, bedding, mattress pads, window treatments, etc.)

Textiles (e.g., apparel, footwear, upholstery, etc.)

Industrial/Military/Safety (e.g., clean room garments, hazardous materials (HAZMAT) garments, firefighter wear, rainwear, protective clothing, tents, tarps, weapons holsters, uniforms, product packaging, etc.)

Automotive (seating, interior upholstery, interior panels, convertible roofing, etc.)

Medical (e.g., dressings, bandages, surgical barriers, surgical gowns, cast linings, masks, gloves, orthopedic products, blood pressure cuffs, etc.)

Personal Care (e.g., diapers, adult incontinence products, feminine care products, etc.)

Sports (ski-wear, underwater-wear, tents, etc.)

Commercial environments (e.g., wallcoverings, draperies and/or upholstery/seating in public venues, restaurants, schools, hospitals, etc).

Figure 3:
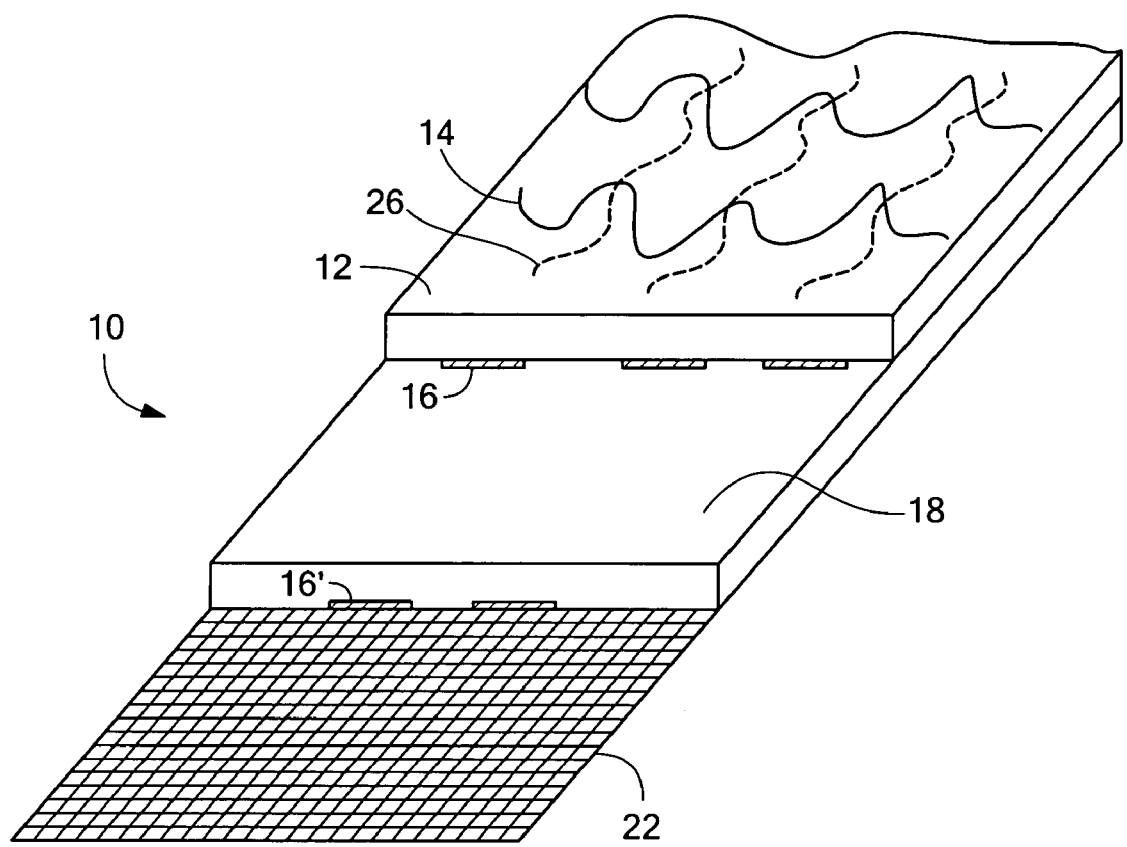
FIG. 3 is a cutaway perspective view of the laminate of FIG. 2.

Referring now to the figures, FIG. 1 is an exploded cross sectional view of a laminate 10 in accordance with a first embodiment of the invention, and FIG. 2 is an exploded cross sectional view of a laminate 10 in accordance with a second embodiment of the invention. FIG. 3 is a cutaway perspective view of the laminate of FIG. 2. The embodiments of FIGS. 1 and 2 are substantially similar and differ primarily in that the laminate 10 of FIG. 2 includes variation 26, whereas the laminate 10 of FIG. 1 is not embossed.

Referring to FIGS. 1, 2, and 3, the laminate 10 includes a top layer 12 coupled to a backing layer 18 by a first layer of adhesive 16, and an optional web layer 22 coupled to the backing layer 18, by a second layer of adhesive 16'. (The term "layer," as used herein not only refers to a single sheet or quantity of a material or element, but also can include a plurality of sheets of material or quantities of an element, etc., that together can form a layer.) An optional printed pattern (which may be ornamental) is provided as printing layer 14. In FIGS. 1, 2, and 3, the printing layer 14 is illustrated as being printed on the back side of the top layer 12, and can be printed in reverse, as shown in FIGS. 1 and 2. The top layer 12, printing layer 14, backing layer 18, and web layer 22, together with the adhesive layers 16, 16', are coupled together, advantageously by lamination, to form the laminate 10. Note that lamination is not the only way to couple the layers together. For example, virtually any process capable of providing sufficient heat and/or pressure to couple together two or more layers is usable. Cold lamination may also be usable, depending on the adhesives and/or materials used in the layers. In addition, depending on the adhesive used, the process used to cure the adhesive layers 16, 16' (e.g., heat, ultraviolet light (UV), etc.) may be sufficient, in and of itself, to couple the top layer 12, printing layer 14, backing layer 18, and/or web layer 22 together.

The top layer 12, printing layer 14, first adhesive layer 16, and backing layer 18 can be first laminated together to form an upper structure 24, which is then laminated to the web layer 22. This laminate structure 10, when used as a wallcovering, provides many of the benefits of PVC wallpaper, but reduces pollution of indoor air with dangerous PVC chemicals. In addition the laminate 10 is breathable, to help discourage mold growth.

Lamination can be accomplished using any conventional lamination process (including but not limited to press lamination, fused roller, engraved gravure roll, pouch lamination, cold lamination, etc.), and such processes are well known to those skilled in the art. The lamination process depends at least in part, as is also known, on the specific adhesive(s) used in the adhesive layers 16, 16'. For example, lamination can be accomplished using a patterned applicator roll called a gravure roll with a doctor blade that delivers the appropriate weights. In one exemplary embodiment, for the adhesive layer 16 (that couples the top layer 12 to the backing layer 18), lamination is accomplished via a quad pattern roll that applies a weight of 25 grams per square meter (GSM) at a temperature between 230 and 270 degrees Fahrenheit (F). The top layer 12 is nipped to the adhesive 16 immediately after the adhesive is applied. For laminating the backing layer 18 to the web layer 22, with the second adhesive layer 16', lamination is accomplished via a cross hatch pattern gravure roll designed to apply 10 to 50 GSM to the web layer 22, and then the backing layer 18 is nipped to the second adhesive layer 16' immediately after the adhesive is applied. For non-breathable adhesives 16, 16', any lamination technique is usable as long as the adhesive ends up (or remains) in a substantially discontinuous pattern. The lamination process (or other process for coupling the layers together) can also be selected and adapted such that it also produces sufficient heat and/or pressure (e.g., enough to soften the top layer 12) to provide variation 26 (as described further herein) at substantially the same time.

The upper structure 24 can be used "as is" as a finished product (e.g., as a wallcovering, breathable article, etc.) or can be subsequently laminated to the web layer 22. If desired, a variation 26 in the top surface 13 of the top layer 12 can also be formed. For example, the upper structure 24 can have a variation 26 formed therein (such as by laminating, embossing, etc) before the upper structure 24 is coupled to the optional web layer 22, or the variation 26 can be formed after the upper structure 24 is coupled to the optional web layer 22.

The top layer 12 (also referred to herein as upper layer 12 and/or first layer 12) is made using a film having a toughness sufficient for the application (e.g., withstanding impact when on the wall without tearing from the impact), so that the top layer 12 can serve as a protective layer, to protect the printed layer 14. Advantageously, the top layer 12 is made from a non-yellowing film, and has a top surface 13. The term "film" as used herein also encompasses (but is not limited to) polymeric sheets, ribbons, and the like, coatings (as on a substrate or other layer), laminates (where the laminate can comprise a single layer or a plurality of separate layers, for example a release layer and/or a film layer), composite articles (e.g., multi-ply laminates and sandwich articles), skins, and membrane coverings.

Figure 10:
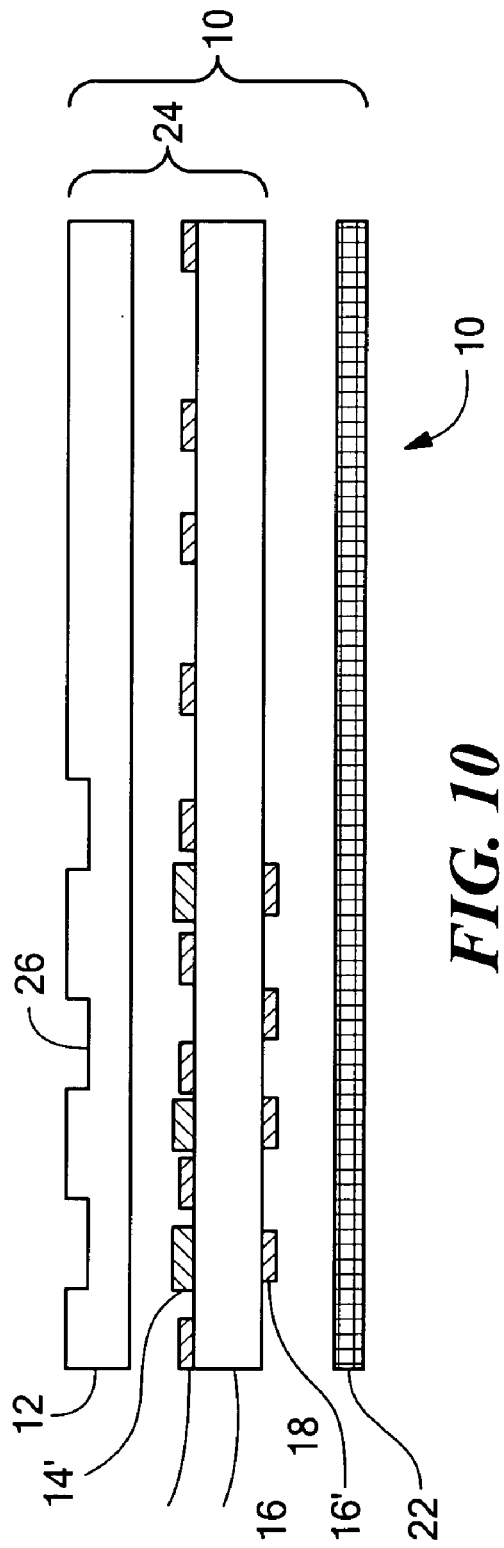
FIG. 10 is an exploded cross sectional view of a laminate in accordance with a fifth embodiment of the invention.

The top layer 12 can be any thickness desired, depending on the permeability that is required in the application. The thickness of the top layer can also depend on the desired depth of a variation 26 formed in the top surface 13 of the top layer, such as by laminating, embossing, stamping, etching, etc. The variation 26 can, for example, include one or more of a pattern, graining, raised effect, or depressed effect. For example, in the illustrative example of FIG. 2, the variation 26 is a depressed effect, having a depth 15. Generally, the thicker the top layer 12, the greater the potential depth 15 but the lower the permeability. In one embodiment, the useable range of the film thickness is from about 0.4 mils to about 15 mils. The thickness of the top layer 12 can be varied to accommodate different embossing depths, as well. If the top layer 12 is covering an ornamentation or other pattern (e.g., a print layer 14 of reverse printing that is printed to one side of the top layer 12, or non-reverse printing 14 to the backing layer 18, as shown in FIG. 10), then it is advantageous if the top layer 12 is transparent or sufficiently translucent, with sufficiently good contact clarity, to permit the ornamentation/pattern that is printed to be visible. The top layer 12 can be opaque if there is no need to view ornamentation or pattern below the top layer, or if no ornamentation or pattern is present.

The top layer 12 is preferably made from a halogen-free material. By halogen-free, it is meant that a material is free of more than trace amounts (i.e., less than about 100 parts per million (about 0.01% by weight)) of one or more halogens (i.e., members of Group 17, e.g., fluorine, chlorine, bromine iodine, astatine). Optionally, the top layer 12 can be corona treated to enhance its adhesion to the other layers. Advantageously, the top layer 12 comprises a breathable polymer material, but the top layer 12 can also be made using a non-breathable polymer, if the polymer can be made breathable during the manufacturing process (e.g., via the systems and methods for creating microapertures described further herein in connection with FIGS. 12-20).

Advantageously, the top layer 12 is also free of harmful plasticizers, such as the aforementioned DNOP, DEHP, phthalates, and the like. Some plasticizers, such as certain urethane plasticizers, may be less harmful than the phthalate plasticizers, and such less harmful plasticizers are usable for at least some embodiments of the invention.

Examples of usable materials for the top layer include (but are not limited to) at least one of polyolefin; polylactide; aliphatic polyurethane; aromatic polyurethane; ether or ester and blends therein; polyurethane blended with ether or ester; poly ether block amide (PEBA); polyetheresteramide block copolymer; poly ether block amide (PEBA) blended with at least one of polyethylene, acid modified poly ethylene, maleic anhydride modified polyethylene, and polyethylene produced by a metallocene process; blends of the polyether block amide blends with the polyurethane blends; PEBA; a blend of PEBA with at least one of ethyl acrylic, methyl acrylic, ethyl methyl acrylic copolymers of acrylic acid and polyethylene; an olefin including ethylene, polyethylene, polypropylene, and polybutene; and copolymers and terpolymers of polypropylene, ethylene, or butene-1, (any of which could be acid modified and/or blended with PEBA). As those skilled in the art will appreciate, the material for the top layer can be selected to optimize materials costs, breathability, stain resistance and permeability for specific applications and designs.

For example, an illustrative embodiment has a top layer 12 that includes 20-100% by weight of poly ether block amide (PEBA) or polyetheresteramide block copolymer. One brand of PEBA usable with at least some embodiments of the invention is PEBAX, available from Arkema Group of Paris, France. The PEBA can be used alone or can be blended with acrylic, methyl acrylic and ethyl methyl acrylic copolymers of acrylic acid and polyethylene. The PEBA and/or PEBA blends provide stain resistance, non-yellowing and breathability to the first layer 12. The more PEBA in the blend that forms the top layer 12, the more the breathability the laminate 10 exhibits. Permeance is a term used to characterize breathability or moisture permeability in certain products and is defined as the time rate of water vapor transmission through a unit area of material (e.g., grams of moisture permeating a sample per square meter per hour) under predetermined conditions. Permeance is used as a performance value (e.g., 1 Perm, 75 Perms, etc.), rather than a property. Permeance is commonly used with finished products, such as wallcoverings.

For example, the inventors have found that a top layer 12 having about 20% PEBA results in the laminate 10 having a perm number of about 11; 30% PEBA results in the laminate 5 having a perm number of about 12; and 100% PEBA results in the laminate 10 having a perm number of about 150.

In another example embodiment, if the top layer 12 includes PEBA, in some instances it may be desirable (although not required) to include in the top layer 12 a small amount of maleic acid polyethylene modified copolymer to improve the blending of certain polymers, such as the ethyl methyl acrylate ethylene copolymer or the acrylic acid ethylene copolymer with the PEBA. An additional benefit of adding the maleic acid polyethylene modified copolymer is the potential reduction in material cost that results by using the majority of acrylic acid ethylene copolymer, as this material is presently only about 21% the cost of PEBA.

For example, at current costs, maleic acid polyethylene modified copolymer (MAPE) is about one and a half to two times the cost of ethyl methyl acrylate ethylene copolymer (EMA), and PEBA is about 4.8 times the cost of the ethyl methyl acrylate ethylene copolymer. As an example, in an illustrative embodiment, the top layer 12 comprises about 30% PEBA by weight and 70% EMA by weight. In another illustrative embodiment, the top layer comprises about 30% PEBA by weight, 5-10% MAPE by weight, and 60-65% by EMA by weight. These examples are illustrative and not limiting. It is preferred that top layer 12 have as much EMA as possible, to maximize permeability at the lowest possible cost. As another example, one embodiment of the invention uses a layer of PEBA or urethane on top of polyethylene, with optional maleic acid, which can reduce cost while improving breathability.

If a non-breathable copolymer, such as polyethylene copolymer, is used for the top layer 12, it is helpful to blend the non-breathable copolymer with PEBA to provide the appropriate level of breathability in the final product. Alternately, the top layer 12 can be made of any material that possesses the qualities and performance required for the application (even materials that are substantially non-breathable) and is capable of being formed into a film. Non-breathable materials are still usable for the top layer 12 so long as the material can be made breathable, such as by forming apertures therein. Forming apertures of a variety of sizes can be done by a variety of processes, as those skilled in the art will appreciate. In one embodiment (described further herein) an inventive method for forming microapertures in the top layer 12 is provided. This method, as well as examples of its implementation, are described later in connection with described further herein in connection with FIGS. 12-20.

Usable materials for the top layer 12 include (but are not limited to) virtually all thermoplastics, including but not limited to cast, blown, molded, and oriented versions of materials such as polypropylene; copolymers and terpolymers of polypropylene; low density polyethylene; medium density polyethylene; linear low density polyethylene; metallocene polyethylene; high density polyethylene; polybutene-1; propylene; butene-1 multi-polymers; polyethylene terephthalate; polybutylene terephthalate; polycarbonate and related copolymers; polymethylacrylate and copolymers of methylacrylates; polyamide; nylons; polylactide; LEXAN (available from General Electric (GE) Plastics; Pittsfield; Mass.); polyacrylontrile butylene styrene; polyacetal; polystyrenes; ionomers; thermoplastic urethane; olefin; polyolefin; ethylene; ethylene vinyl acetate (EVA); ethylene acrylic acid copolymer (EAA); ethylene methylacrylic acid (EMA); 2-ethoxy ethyl methacrylate (EEMA); many types of acrylic acids (e.g.; methyl acrylic acid); copolymers of polypropylene; terpolymers of ethylene; polypropylene; polybutene; and butene-1; and other polymers known to those skilled in the art. Theoretically, polymer materials that include halogens, such as polyvinyl chloride and polyvinylidene chloride, are also usable as the top layer 12, but in applications where being halogen-free is required, such halogen-containing materials preferably are avoided.

Although optional for some embodiments, for other embodiments, forming one or more variations 26 in the top layer 12 is an important part of ensuring optimum functionality of the laminate 10. The particular illustrations, shapes, dimensions, etc., of variations 26 shown in the Figures herein are not intended to be limiting, nor are the illustrative variations 26 intended to imply that there is only one method for forming them. A variation 26 as used herein includes the result of any method or process for imparting a specific pattern, graining, texture, depressed effect, raised effect, and/or change in the level of the surface of a material, such as the level 13 of top layer 12. For example, methods for forming the variation 26 includes processes such as "positive" embossing (i.e., raising a section up out of a layer of material) and "negative" embossing (i.e., depressing a section into a layer of material), and combinations of positive and negative embossing. Forming a variation 26 can be accomplished during the formation of the top layer 12 and/or at a later operation (e.g., during lamination or as a separate step, such as embossing, stamping, etching, etc.). Embossing, for example, generally requires that the material being embossed to first be at an elevated temperature sufficient to soften the material being embossed, then to be at a cooler temperature to set in the embossing pattern.

For the illustrative variation 26 shown in FIG. 2, the depth 15 of the variation 26 depends at least in part on the depth of the top layer 12. In an exemplary embodiment, with a top layer 12 of about 5 mils thick, the depth 15 of variation 26 goes approximately 3-5 mils deep into the top layer 12. In some instances, the depth 15 of variation 26 can be deep enough into the top layer 12 to create a corresponding deformation 27 in the backing layer 18, as illustrated in FIG. 2. The top layer 12 generally is made from a material (e.g., a thermoplastic or other material capable of softening under heat and/or pressure) that takes embossing well. Note also that the top layer 12 can be made from a film that can be glossy or non-glossy. If the top layer 12 is glossy, then after heat and/or pressure is applied to the top layer, areas may be formed in the top layer 12 containing both shiny and non-shiny portions.

The variation 26 of the top layer 12 can be formed using any known method for providing a texture, grain, raised area, or depressed area to a surface, including but not limited to a methods involving application of heat, chemicals, and/or pressure, including but not limited to use of a patterned embossing roll or stamp, "bead blasting" (also known as shot blasting (e.g., firing glass or other beads at a surface to have a texture formed thereon)), electro-discharge texturing and grinding (sometimes referred to as mill finish), stamping, etching, laser machining, laser engraving, photochemical etching, and electron beam texturing. It should be noted that the variation 26 could effectively be accomplished as part of another manufacturing processes (that is, variation 26 need not be a separate manufacturing step in and of itself). For example, as those skilled in the art will appreciate, the variation 26 can result from and/or be accomplished as part of a thermal lamination process (e.g., when the top layer 12 is laminated to the backing layer 18 via application of heat and/or pressure, and/or when a layer such as a web layer 22 is laminated to one or more of the other layers or the upper structure 24 via application of heat and/or pressure). Formation of variation 26 can be accomplished via any process or method capable of softening the top layer 12 to a degree sufficient to permit the embossed pattern to be formed therein.

The variation 26 can, for example, be part of a pattern that compliments a pattern formed by the printing layer 14. The variation 26 can also be arranged such that it is only visible at certain angles, or is very difficult to see. The variation 26 formed in the top layer helps in certain applications, such as wallcovering, the resultant laminate 10 to become more flexible, pliable, and "bendable" around non-straight and/or non-linear surfaces, such as corners. In addition, in certain embodiments (described further herein in connection with FIGS. 12-20), the variation 26 helps in the forming of microapertures in the top layer 12 that improve the breathability of the top layer.

Referring again to FIGS. 1, 2, and 3, the print layer 14 is disposed beneath the top layer 12, which enables the laminate 10 to be scrubbable (i.e., the top layer 12 can be scrubbed, such as with a brush or sponge and a detergent solution, without removing the printing below it). The print layer 14 can be printed with virtually any type of ink. Advantageously, the ink may be either solvent based or water based as long as the ink system and solvent system are halogen free. The print layer 14 can be provided by one or more of a variety of methods, including but not limited to gravure, flexographic, flexo process dot, laser printing, dye diffusion, dye sublimation, thermal transfer, silkscreen transfer, lithographic, screen or digitally by ink jet, bubble jet or piezo electric and other means as may be invented. The print layer 14 can also be provided without use of ink, such as by laser marking, etching, or engraving. As noted above (and further described herein), the print layer 14 can be provided as a reverse printed pattern on the top layer 12, or as a pattern directly printed to backing layer 18. If the print layer 14 is directly printed to the backing layer 18, the backing layer 18 should include (or be made from) a print-receptive surface (this is explained further herein).

It should be understood that the pattern of the print layer 14 (as well as the discontinuous pattern of adhesive) includes any configuration or arrangement of one or more elements (e.g., printing, one or more variations 16, adhesive, etc.) that forms a design, whether natural, accidental, or intentional, whether regular or irregular, functional or ornamental. A pattern can comprise designs on one or more layers and may create new patterns, or only become visible, when one layer overlays another (e.g., embossing on a transparent top layer 12 that is overlaid over a backing layer 18 having printed 14 thereon that together forms an ornamental design). A pattern can include one or more indicia that convey information, and can include not only indicia suitable for human reading, but also markings visible only in certain types of light (e.g., optical brighteners and other substances visible in certain lights, such as ultraviolet (UV) light) and/or that are intended for machine reading.

The first and second adhesive layers 16, 16' are each provided in FIGS. 1, 2, and 3 as a discontinuous pattern of adhesive. A discontinuous pattern is advantageous to help ensure that the laminate 10 is breathable, by helping to ensure sufficient adhesion while also providing for some areas to be free of adhesive (permitting moisture vapor to pass through). The discontinuous pattern can be advantageous because many adhesives are not normally permeable/breathable. Examples of discontinuous patterns include (but are not limited to) dots, lines, crosshatches, etc.

Figure 8:
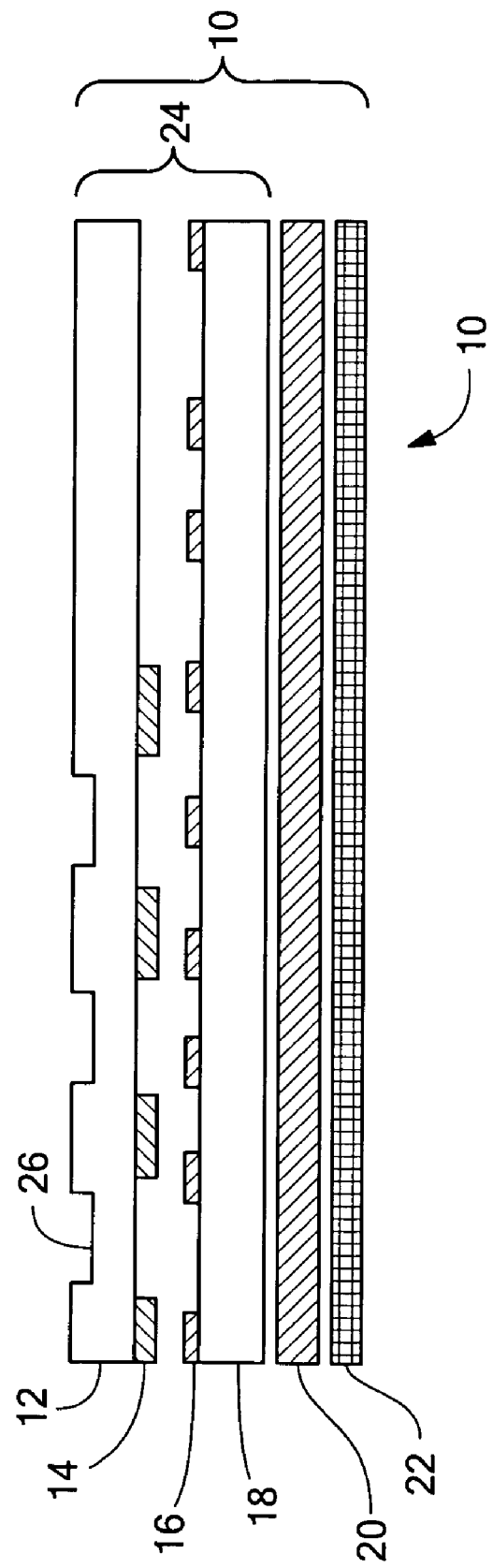
FIG. 8 is an exploded cross sectional view of a laminate in accordance with a fourth embodiment of the invention.
Figure 9:
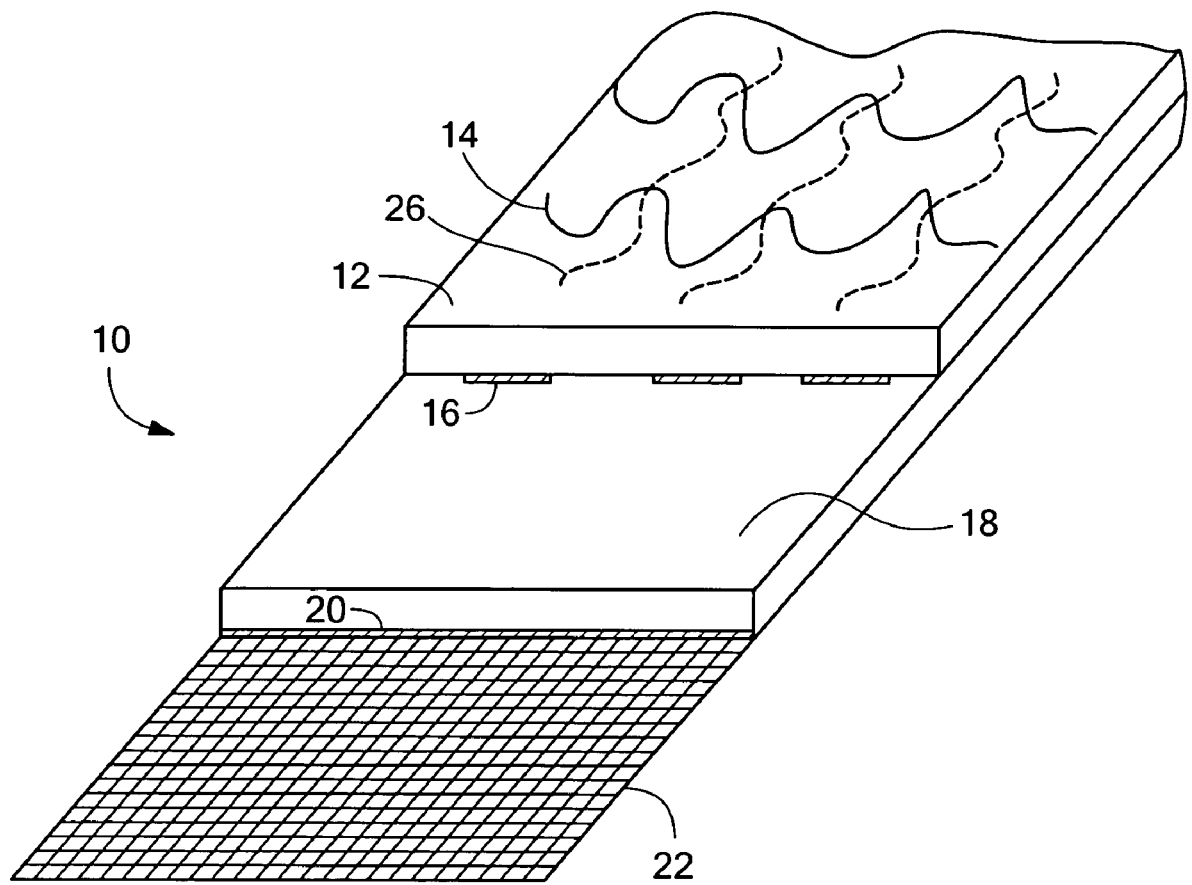
FIG. 9 is a cutaway perspective view of the laminate of FIG. 8.

Either or both of the first and second adhesive layers 16, 16' can also be provided as a discontinuous pattern or a continuous layer of a permeable or breathable adhesive (as illustrated by continuous adhesive 20 in FIGS. 8 and 9, discussed further herein). If a permeable adhesive is used, care must be taken to avoid the possibility of delamination when moisture passes through the laminate 10 at high rates or for long times, because some breathable adhesives are hydrophilic, swelling in the presence of water and weakening over time. Examples of usable breathable adhesives include (but are not limited to) cross linked polyether polyurethanes, such as provided by Polyurethane Specialties of Lundhurst, N.J., 52158 COMFORTEX, available from Raffi & Swanson, Inc. of Wilmington, Mass., 2U283, available from Forbo Adhesives, Inc. of Durham, N.C., and 66-425 adhesive, available from Stahl International BV of The Netherlands.

In one embodiment, the first adhesive layer 16 and second adhesive layer 16' are a moisture cure adhesive, such as cross-linking adhesive. Use of a moisture cure adhesive can be especially useful where the laminate 10 is to have a variation 26 formed thereon, such as by application of heat, because a moisture cure adhesive will not soften and lose its grip if the temperature process window for the application of heat (e.g., an embossing temperature process window) is exceeded. Examples of moisture cure adhesives usable with at least some embodiments of the invention are 2U105 and 2U336, available from Forbo Adhesives, Inc. of Durham, N.C. Other types of adhesives (including, but not limited to catalyst cure, thermal cure electron beam cure, ultraviolet (UV) cure, etc) can be used as well.

Neither the first adhesive layer 16, nor the second adhesive layer 16' has to be transparent. For example, in one embodiment, the first adhesive 16 is a light yellow color, but because the first adhesive 16 is "behind" print layer 14, the color of the adhesive may not matter.

The thickness of the first and second adhesive layers 16, 16' is adapted to the overall size of the laminate 10. For example, in one embodiment, the first adhesive layer 16 has a thickness of about 1-2 mils. The thickness of the first adhesive layer 16 does not have to be the same as the thickness of the second adhesive layer 16'. When either or both of the first and second adhesive layers 16, 16' is discontinuous, another way of expressing the thickness of the first and second adhesive layers 16, 16' is by the adhesive weight. In some embodiments, the adhesive used for the first and second adhesive layers 16, 16' has an adhesive weight of about 20-50 GSM (often closer to the lower end of the range). For example, for the first adhesive layer 16, an adhesive with a weight of 25 GSM works out to be about 1 mil, if evenly distributed.

The thickness of the second adhesive layer 16' is generally similar to that of the first adhesive layer 16 (although it need not be, as discussed above), but because the second adhesive layer 16' is coupling the backing layer 18 to a web layer 22 (where the web layer 22 is not a solid surface, but rather is a lightweight material that is somewhat discontinuous itself), the second adhesive layer 16' can have a lighter weight than the first adhesive layer (e.g., about 10-20 GSM (often closer to the lower end of that range).

Either or both of the first and second adhesive layers 16, 16', whether a breathable adhesive or not, can include application-specific additives, such as fungicides and fire retarding (FR) chemicals (e.g., non-migrating solid FR chemicals). Generally, FR chemicals work best when as close to the flame source as possible. For applications such as wallcoverings, the flame source would be closest to the top layer 12, or actually on the top layer 12, so it is beneficial for the FR chemical to be located as close as possible to the top layer 12 without jeopardizing other properties. It is beneficial if the FR chemical is provided just under the print layer 14 (e.g., in the first adhesive layer 16), so that the FR chemical can be polymerized into the adhesive back bone (also referred to as the cross-linked adhesive after cure) to reduce the likelihood that the FR chemical is able to migrate out of the laminate 10.

To ensure that the overall laminate 10 remains halogen-free, it is helpful to use an FR chemical in the phosphate family (FR chemicals in the phosphate family do not necessarily contain halogens). FR chemicals containing halogens can, however, be usable if they are properly applied and configured to reduce likelihood of outgassing or other problems. For example, in one embodiment, the FR chemical is a halogenated polyol, which can be copolymerized into the top layer 12 (e.g., urethane) backbone to virtually eliminate the risk of halogen outgassing except in cases of fire. It is also possible to use other non-halogenated FR chemicals (e.g., magnesium hydroxide, aluminum hydroxide, magnesium hydroxycarbonate, magnesium-calcium carbonate) cyclic phosphate esters and/or fungicides, although some of these may have a dark color that can limit their use to certain applications and/or designs.

In some instances, it may be possible to provide a laminate 10 that has reduced halogens (versus being halogen free) as compared to other similar products. One way to do this is, in accordance with one embodiment of the invention, is to provide a halogen-free top layer 12, a halogen free backing layer 18, and a halogen-free (optional) web layer 22, but permit small amounts of halogens in an adhesive layer. For example, for fire resistance, it is optimal for the FR chemical to be as close to the source of flame as possible. Thus, a halogen-containing FR chemical, including but not limited to halogenated phosphate, Tris-(1,3-dichloro-2-propyl)-phosphate, and blends of decabromine and antimony pentaoxide or trioxide could be provided in one or both of the adhesive layers 16, 16'. For example, the first adhesive layer 16 and/or the second adhesive layer 16' can include about 5-20% by weight of an FR chemical (note that too much FR chemical in an adhesive may reduce adhesion).

The application specific additives could also be provided in the top layer 12, although this may be prone to several problems, such as (a) making the top layer 12 somewhat tacky and prone to blocking; (b) eventually discoloring the top layer 12, resulting in unacceptable color fastness; and (c) possible migration out of the top layer 12, which (depending on the composition of the FR chemical) could jeopardize indoor air quality and long-term fire resistance.

For applications such as wallcoverings, the fungicide can be most beneficial if provided in the second adhesive layer 16' (i.e., where the backing layer 18 attaches to the web layer 22), because the web layer 22 side is generally the side that is directly attached to a wall. The wall cavity and/or wall is usually the wettest location and thus the most likely location for mold or fungi to initiate growth. Because fungicides can add to the overall cost of the laminate 10, it may be most beneficial to provide fungicides for laminates intended for use in specific "problem" locations or in humid climates where mold or fungi growth are more likely.

Referring again to FIGS. 1, 2, and 3, the backing layer 18 provides both a support structure for the laminate 10 and a backing color to the print layer 14 and/or the variation 26. The backing layer 18 consists of a non-woven material, such as a paper like material, comprising natural cellulose and synthetic fibers treated with a chemical binder (e.g., an acrylic or polyvinyl alcohol). The cellulose can be reinforced. For example, in one embodiment, the backing layer 18 comprises cellulose having a structure comprising a plurality of openings (e.g., interstices), with a polyester or polyolefin reinforcing layer in at least a portion of the openings. In another embodiment, the backing layer 18 comprises just cellulose, with no reinforcing layer. The backing layer 18 can be inherently variable in its thickness, so it is generally categorized by a weight per area, e.g. GSM. At least some embodiments of the invention use a backing layer 18 having a weight in the range of 20 GSM to 170 GSM; for example, various embodiments of the invention have been implemented using a backing layer 18 having a weight of 70 GSM, 120 GSM, and 147 GSM. The range of 20 GSM to 170 GSM is not limiting. As those of skill in the art will appreciate, the thickness of the backing layer 18 can vary based on the application and need not be the same as other layers of the laminate 10. For example, in wallcovering applications where no web layer 22 is provided, the backing layer 18 may be sufficiently thick so as to be dimensionally stable when wet, to facilitate hanging on a wall.

An example of non-woven, cellulosic material usable with at least some embodiments of the invention includes paper and paper-like materials. Non-woven, paper and paper like materials are inherently breathable, and, for applications such as wallcoverings, are advantageous to use because they are able to provide sufficient weight to the laminate 10 to meet various wall covering standards (e.g., CCFA-W-101-D (2002), Chemical Fabrics and Film Association (CCFA) Quality Standard for Vinyl Coated Fabric Wallcovering; Type II, Medium Duty, of the United States Federal Specification for Vinyl Coated Wall Coverings, CC-W-408D, Jan. 14, 1994, etc.), while still being able to bend around corners. For example, materials usable for at least some embodiments of the invention, which also satisfy the aforementioned Type II standard, include wallcovering substrates available from Ahlstrom Corporation of Belgium, including but not limited to the GRADE 8001 and GRADE 8915 materials. Other nonwoven materials, such as synthetic materials (e.g., TYVEK, available from E.I. DuPont DeNours of Wilmington, Del.) may be usable, depending on the application. Of course, for wallcoverings meeting other weight standards (e.g., Type I, Type III, etc.), the selection of usable materials for the backing layer 18 will vary.

If the backing layer 18 has a print layer directly applied to it (e.g., as shown in FIG. 10), the backing layer 18 is made so as to have a print receptive surface, such as a clay coated calendered paper or cellulosic non woven or a polyethylene or acrylic coated calendered surface. Selection of an appropriate backing layer 18 is application dependent. For example, use of a print receptive backing layer 18 might increase the cost of the backing layer 18 and may reduce the flexibility of the backing layer 18, which can reduce the bendability and possibly the embossability of the laminate 10. This may be acceptable in certain environments (e.g., wall appliqués) and less preferred in others (e.g., wall paper, breathable fabrics, etc.).

Referring again to FIGS. 1, 2, and 3, the web layer 22 is an optional layer that serves as a substrate for the laminate 10 and can improve the tear resistance, strippability (i.e., enabling stripping in few pieces, e.g. in about one piece, while preferably leaving a minimum of paste or adhesive residue on the wall, without substantial damage to the wall's surface) of the laminate 10, and helping to make the laminate easy to remove. Ease of removal is advantageous if the laminate 10 is used as a wallcovering, especially in commercial applications. The web layer 22, in one embodiment, is made from a scrim material composed of polyester or cotton fibers and/or blends of polyester and cotton. Lightweight scrim and more heavyweight scrim (e.g., the so-called osnaberg) are examples of materials usable for the web layer; those of skill in the art will appreciate that virtually any material capable of providing the breathability, strippability, and tear resistance, is usable for the web layer 22. For wallcovering applications, using a web layer 22 can make a resultant laminate 10 heavier and more costly, but a laminate 10 that includes a web layer 22 makes it easier to bridge the laminate 10 over imperfections in the surface (e.g., wall) being covered.

For exemplary wallcovering applications, regular scrim is used for "light" construction areas and osnaberg is used in medium to heavy usage areas, such as commercial building corridors. The scrim (e.g., osnaberg scrim) is about 50 GSM to 100 GSM but can be lighter or heavier. Scrim comes with various size openings (e.g., interstices), and in one embodiment, the web layer 22 is made from a scrim with interstices that are approximately $\frac{1}{32}$ of an inch square. The size of the interstices depends on the denier of the yarns and the count of yarns per inch. Those skilled in the art will appreciate that many different varieties of scrim, webbing, etc., are adaptable, depending on the application. In one embodiment, the scrim used for the web layer 22 has a tear strength of 50 Lbs. per inch and a cotton content of 50% minimum (for absorbency of the second layer of adhesive 16'), the balance being polyester (which generally is low in cost).

Figure 4:
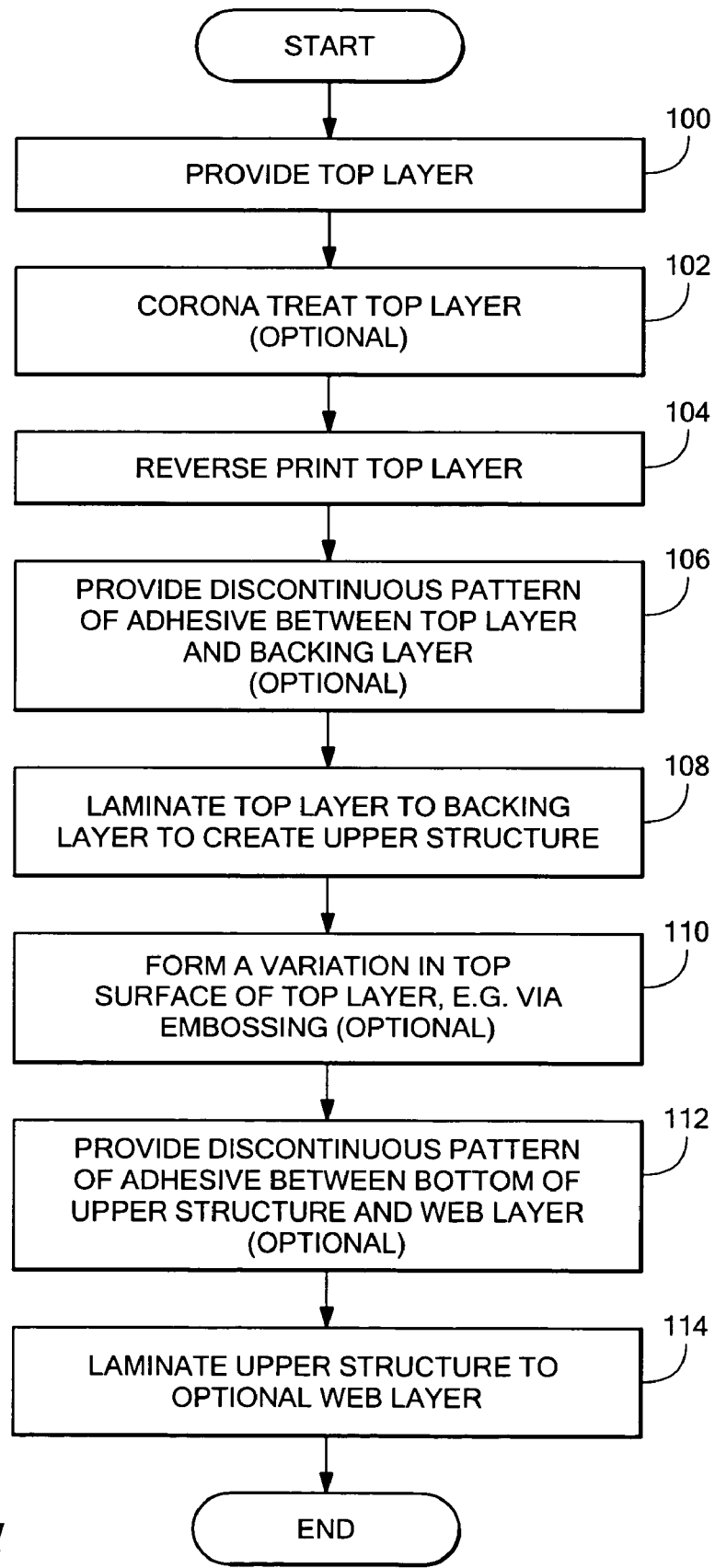
FIG. 4 is a flow chart of a first method for making the laminates of FIGS. 1 and 2.

FIG. 4 is a flow chart of a first method for making the laminates of FIGS. 1-3, and FIG. 5 is a flow chart of a second method for making the laminates of FIGS. 1-3. Referring to FIGS. 1-4, a top layer 12 is provided (block 100), the top layer having top and bottom sides. The top layer optionally can be corona treated (block 102), to enhance adhesion. The bottom side of the top layer 12 is reverse printed (using any of the aforementioned print methods) with print layer 14 (block 104), and a first adhesive layer 16 is provided, in a discontinuous pattern, between the top layer 12 and the top side of a backing layer 18 having top and bottom sides (block 106). Note that the block reciting use of a first adhesive layer 16 can, for at least some embodiments, be optional because, in at least one embodiment (see FIG. 11, described further below) is possible to laminate the top layer 12 directly to the backing layer 18 without use of adhesive.

The top layer 12 is laminated to the backing layer 18 to create upper structure 24 (block 108). The backing layer 18 provides a background color to the reverse printed top layer 12. If desired, one or more variations 26 are formed in the top layer (block 110) after the first layer of adhesive 16 cures. The variation 26 can be formed by various methods; in one illustrative embodiment, it is formed by embossing. The variation 26 provides a texturing (as described previously) to the top surface of the top layer 12, which can increase the permeability of the laminate 10. A second layer of adhesive 16' is provided in a discontinuous pattern between the bottom side of the backing layer 18 (i.e., the bottom of the upper structure 24) and the top side of a web layer 22 having top and bottom sides (block 112). The upper structure 24 is then laminated to the web layer 22 (block 114).

Figure 5:
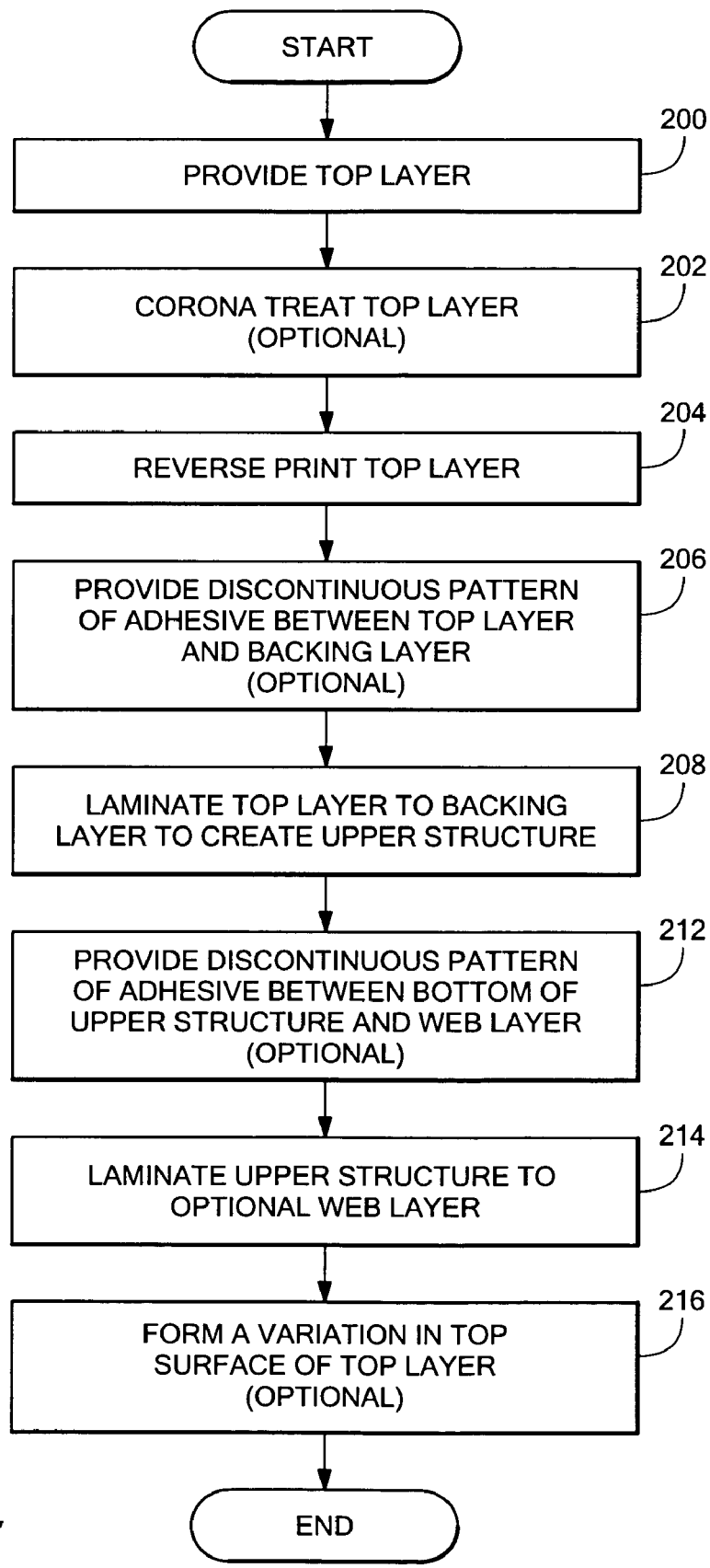
FIG. 5 is a flow chart of a second method for making the laminates of FIGS. 1 and 2.

The method of FIG. 5 is substantially similar to the method of FIG. 4, except that the one or more variations 26 in top layer 12 are formed after the entire laminate 10 is laminated together (block 216), instead of when the upper structure 24 is formed (block 208). Otherwise, each block beginning with a "2" in FIG. 5 is equivalent to the corresponding block beginning with a "1" in FIG. 4 (i.e., block 200 is the same as block 200, block 202 is the same as block 102, etc.).

Although not illustrated in FIGS. 4 and 5, the variation 26 could be substantially simultaneously with another action. For example, in FIG. 4, when the top layer is laminated to the backing layer (block 108), the lamination process itself could form one or more variations 26 in the top surface 13 of the top layer 15. Similarly, when the upper structure 24 is laminated to the optional web layer 22 (use of a web layer 22 is not required), this lamination process itself could form one or more variations 26 in the top surface 13 of the top layer 15.

Figure 6:
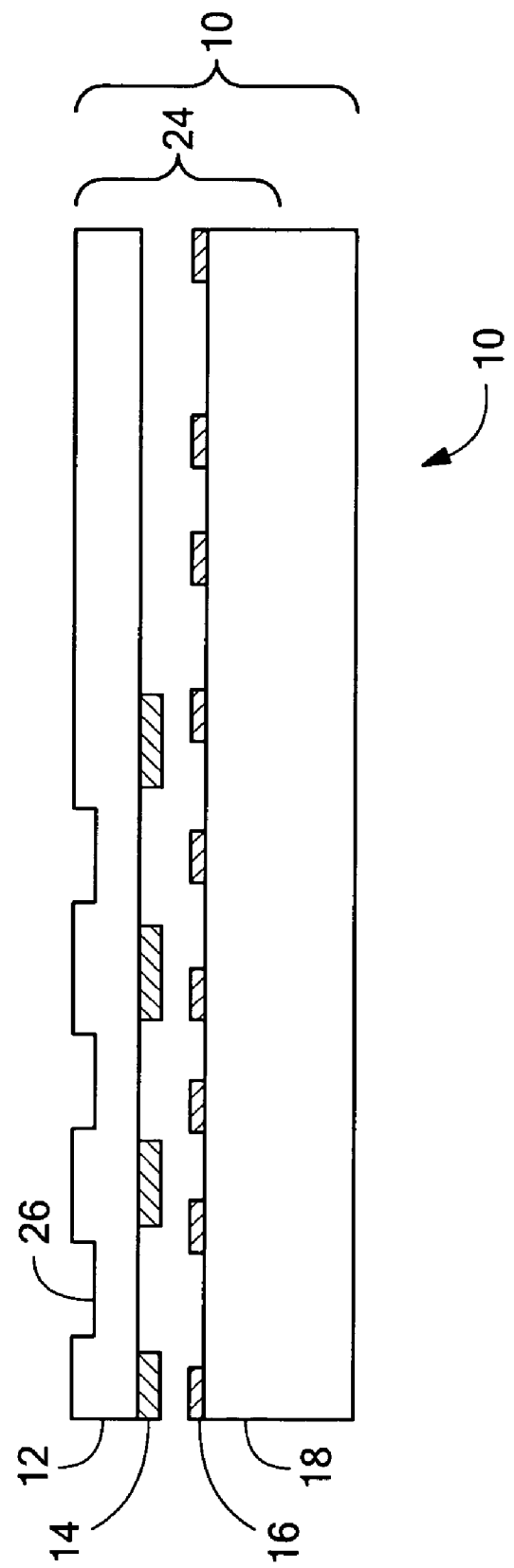
FIG. 6 is an exploded cross sectional view of a laminate in accordance with a third embodiment of the invention.
Figure 7:
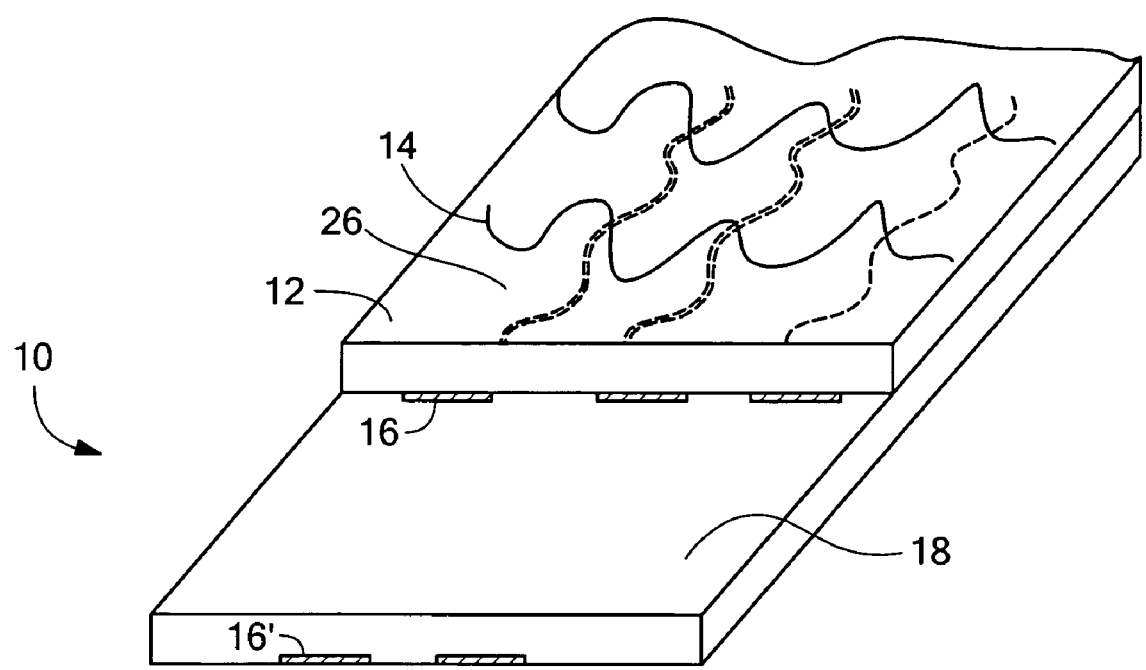
FIG. 7 is a cutaway perspective view of the laminate of FIG. 6.

FIG. 6 is an exploded cross-sectional view of a laminate in accordance with a third embodiment of the invention, and FIG. 7 is a cutaway perspective view of the laminate of FIG. 6. The laminate 10 of FIGS. 6 and 7 is substantially the same as the laminate 10 of FIG. 2, except that the laminate 10 of FIGS. 5 and 6 does not have a web layer 22. The methods of either FIG. 4 or FIG. 5 can be used to make the laminate of FIGS. 5 and 6, except that, for FIG. 4, blocks 112 and 114 would not be performed and, for FIG. 5, blocks 212 and 214 would not be performed.

For the laminate 10 of FIGS. 5 and 6, to meet the aforementioned Type II requirements, it may be necessary to increase the weight and/or thickness of the backing layer 18 (as shown in FIG. 6) to meet the minimum weight required by the Type II standard of 15 oz/yd at a width of 54". This additional weight of the backing layer 18 might, in certain applications, limit the bendability of the laminate 10, as discussed previously.

FIG. 8 is an exploded cross sectional view of a laminate 10 in accordance with a fourth embodiment of the invention, and FIG. 9 is a cutaway perspective view of the laminate of FIG. 8. As mentioned previously, one or both of the adhesive layers 16, 16' can be provided as a continuous layer of adhesive. FIG. 8 illustrates a laminate 10 that is substantially similar to the laminate 10 of FIG. 2, except that the second layer of adhesive 16', which is discontinuous in FIG. 2, is replaced in FIG. 8 by a continuous layer of adhesive 20. As explained previously, it is advantageous if the continuous layer of adhesive 10 is a breathable adhesive. Note also that the first layer of adhesive 16 could also be a continuous layer, or could be the sole continuous layer where the second layer 16' remains discontinuous. The methods of either FIG. 4 or FIG. 5 can be adapted to make the laminate 10 of FIGS. 8 and 9, as those of skill in the art will appreciate. For example, in FIG. 4, any of the blocks reciting providing a discontinuous layer of adhesive (e.g., blocks 106 and 112 in FIG. 4) could be replaced with a block reciting "provide a continuous layer of adhesive".

FIG. 10 is a cross sectional view of a laminate 10 in accordance with a fifth embodiment of the invention. The laminate 10 of FIG. 10 is substantially similar to the laminate 10 of FIG. 2, except that the laminate 10 of FIG. 10 has a print layer 14' that is printed directly to the backing layer 18. As discussed previously, in embodiments where the print layer 14' is printed directly to the backing layer 18, the backing layer should be a print receptive material (that is, should be print receptive to the particular printing technique being used). The methods of either FIG. 4 or FIG. 5 can be adapted to make the laminate 10 of FIG. 10, as those of skill in the art will appreciate. For example, in FIG. 4, block 104's recitation of "reverse print top layer" can be modified to "print to backing layer".

Figure 11:
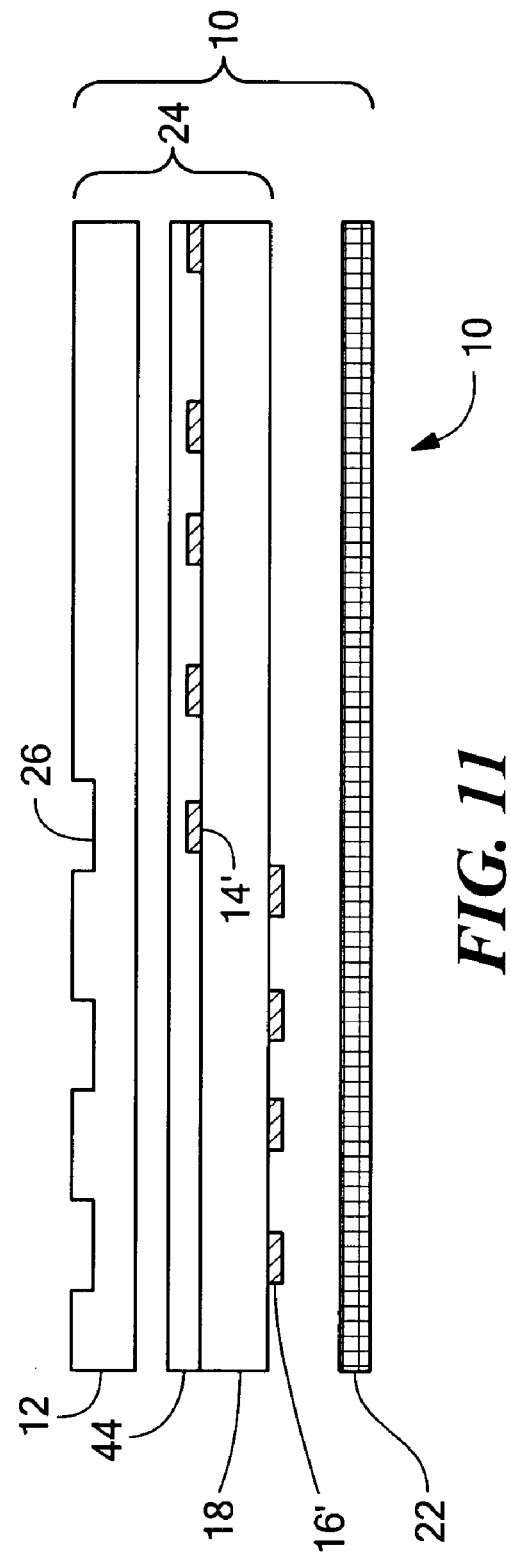
FIG. 11 is an exploded cross sectional view of a laminate in accordance with a sixth embodiment of the invention.

FIG. 11 is an exploded cross sectional view of a laminate in accordance with a sixth embodiment of the invention. The laminate 10 of FIG. 11 is substantially similar to the laminate 10 of FIG. 10, except that the first layer of adhesive 16 is eliminated, so that the backing layer 18 is laminated directly to the top layer 12. A protective coating 44 is provided over the printing layer 14', to protect the integrity of the printing during lamination. Preferably, the protective coating 44 is breathable. For example, a breathable adhesive (e.g., aliphatic polyol reacted with isocyanate) could be used as the protective coating 44. One way to use an aliphatic adhesive such as aliphatic polyol reacted with isocyanate is to bond a top layer or barrier coating (e.g., butyl acrylate acrylic acid polymer dispersions or solutions and the like) over the print layer 14. If a reduced-halogen laminate 10 is being implemented, and most of the other layers have little to no halogens, the barrier coating could comprise, for example, poly vinylidene chloride polymer or copolymers of poly vinylidene chloride with butyl acrylate acrylic acid polymer dispersions or solutions and the like. The methods of either FIG. 4 or FIG. 5 can be adapted to make the laminate 10 of FIG. 11, as those of skill in the art will appreciate. For example, in FIG. 4, block 104's recitation of "reverse print top layer" can be modified to "print to backing layer", and block 106's recitation of "provide discontinuous pattern of adhesive between top layer and backing layer" can be replaced by "apply coating to print layer".

Although the embodiments described above in FIGS. 6-11 are all illustrated as including one or more variations 26, those of skill in the art will appreciate that any of these embodiments can be implemented without forming any variations 26. Further, although the embodiments illustrated in FIGS. 8-11 illustrate a web layer 22, any or all of these embodiments could, of course, be implemented without the web layer 22.

Figure 12:
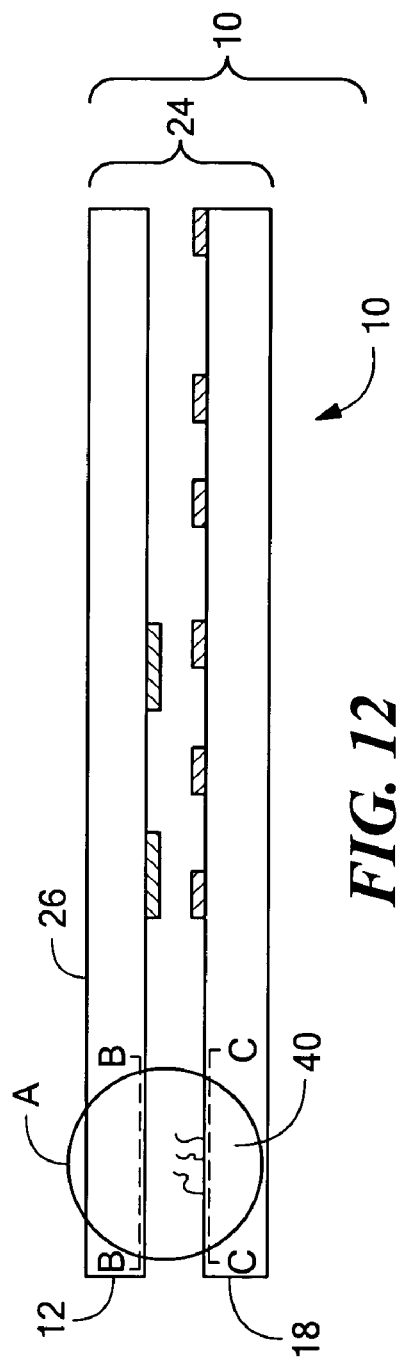
FIG. 12 is an exploded cross sectional view of a laminate in accordance with a seventh embodiment of the invention.

FIG. 12 is an exploded cross sectional view of a laminate 10 in accordance with a seventh embodiment of the invention. Note that the laminate 10 is substantially similar to the laminate 10 of FIG. 6, except that the upper layer 12 has not yet had any variations 26 formed therein, and the backing layer 18 has a plurality of microprojections 40 protecting from its top surface. The laminate 10 of FIG. 15 includes a top layer 12, a backing layer 18, a print layer 14, and an adhesive layer 16. The print layer 14 and the adhesive layer 18 are substantially similar to those described previously (e.g., for FIGS. 1-2).

A microprojection, as used herein, is a projection of a fiber or filament from a material, such as might project from a non-woven material such as a non-calendered material, the back side of calendered material, or a mat of entangled fibers. The diameter of the microprojection is sufficient to enable the microprojection to penetrate (under conditions of pressure and/or heat, such as embossing) a material that the microprojection is disposed near or against, to form a microaperture (also referred to as microhole, micropore or microperforation).

Figure 13:
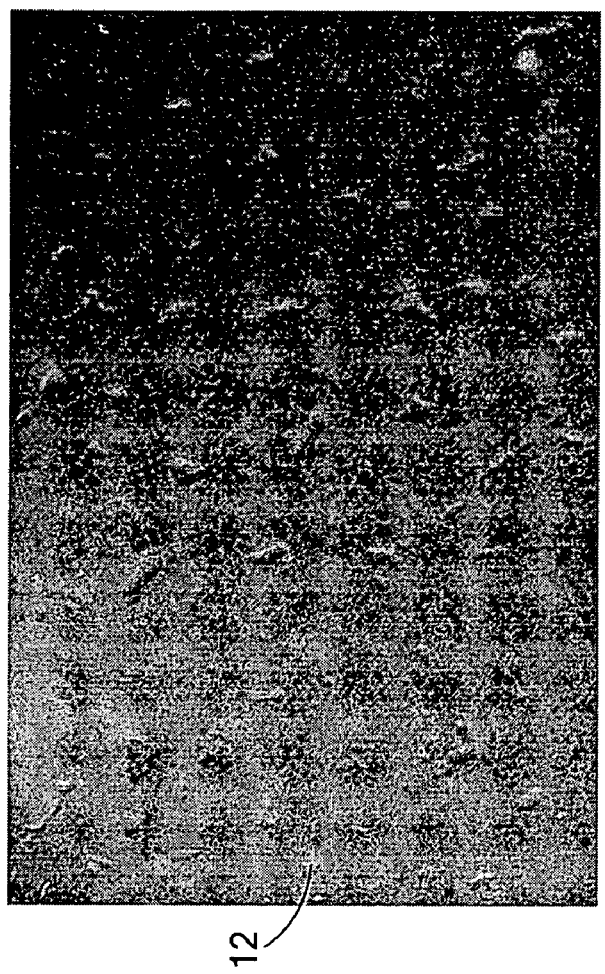
FIG. 13 is a photograph showing an enlarged view of an exemplary upper layer, taken along cross section B-B of FIG. 12.
Figure 14:
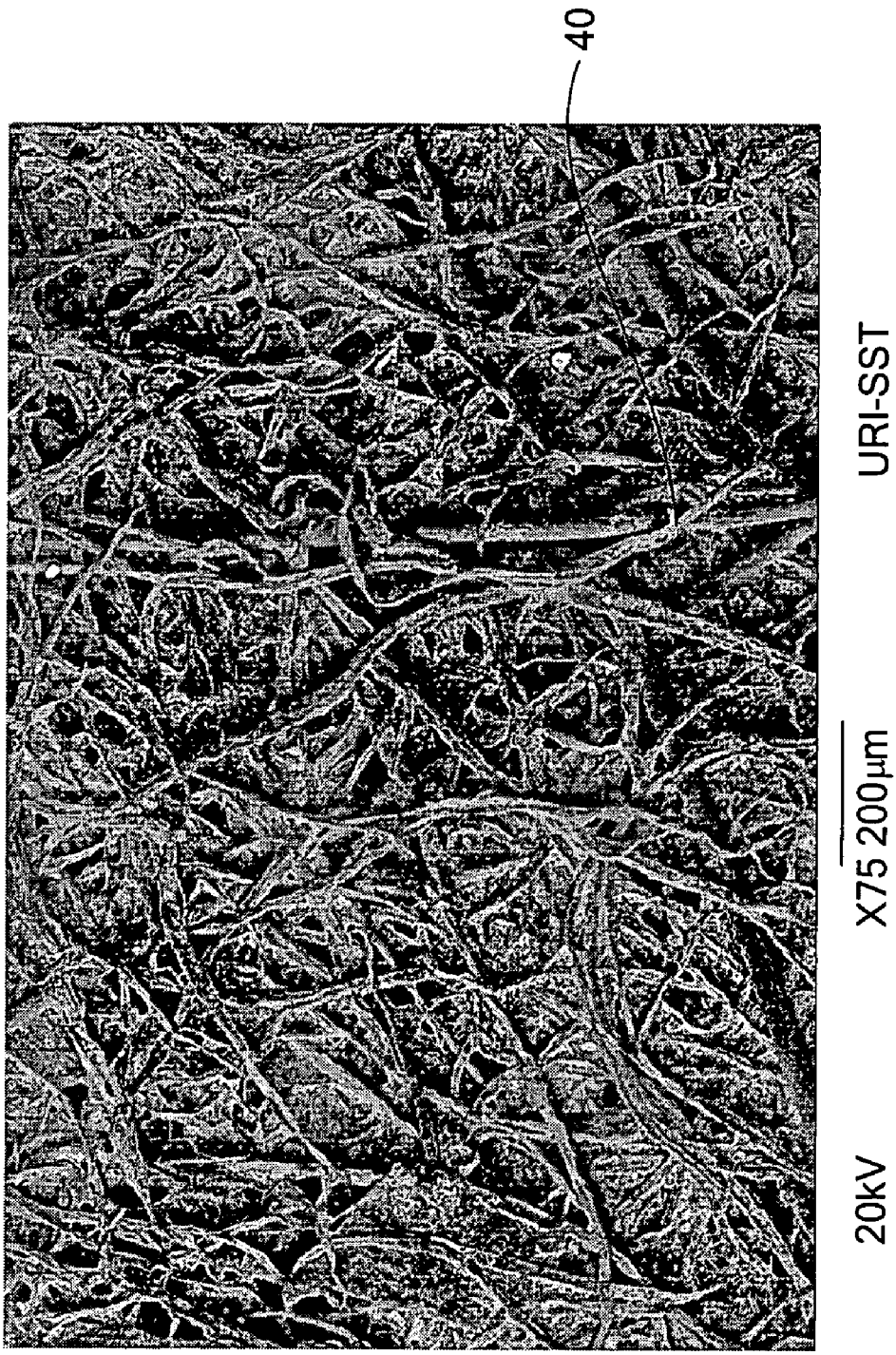
FIG. 14 is a photograph showing an enlarged view of an exemplary backing layer, taken along cross section C-C of FIG. 12.

FIG. 13 is a photograph showing an enlarged view of the bottom surface of an exemplary upper layer 12, taken along cross section B-B of FIG. 12. In this example, the upper layer 12 is made from aliphatic urethane about 1.5-2.0 mils thick. The photograph of FIG. 13 was taken at 75 times magnification. FIG. 14 is a photograph showing an enlarged view of an exemplary backing layer 18 (which in this example is the aforementioned Ahlstrom 8001 material), taken at 75 times magnification, along cross section C-C of FIG. 12, showing the top surface of the backing layer 12, including a plurality of microprojections 40.

FIG. 15 is an exploded cross sectional view of a laminate 10 in accordance with a sixth embodiment of the invention, and FIG. 16 is an enlarged view of section D of FIG. 15. Note that the laminate 10 of FIG. 15 is substantially similar to the laminate 10 of FIG. 6, except that the laminate 10 of FIG. 15 has a plurality of microapertures 42 formed in the top layer 12. Note also that the embodiment 12 of FIGS. 12 and 13, although showing an exploded view, is intended to show the appearance of the laminate 10 after formation of the one or more variations 26. The laminate 10 of FIG. 15 includes a top layer 12, a backing layer 18, a print layer 14, and an adhesive layer 16. The print layer 14 and the adhesive layer 18 are substantially similar to those described previously (e.g., for FIGS. 1-2).

In particular, the embodiments of FIGS. 12-20, described herein, illustrates a unique aspect of the invention whereby the top layer 12 can be made more breathable during the process of forming the one or more variations 26 by using a backing layer 18 having a plurality of fibrous microprojections 40. The inventors have found, surprisingly, that during application of heat and/or pressure to at least some areas of the top surface 13 of the top layer, at least some of the fibrous microprojections 20 penetrate through at least part of the top layer 12, forming a plurality of microapertures 42 (also referred to as microholes or microperforations) in the top layer 12. The microapertures 42 have been found to improve the breathability of the top layer 12 and can enable even materials considered non-breathable (e.g., olefins) to become sufficiently breathable to be usable in many applications that require a breathable laminate.

In addition, for at least some embodiments, it is advantageous that the microapertures 42 are formed during the manufacturing process for the laminate 10 (e.g., during a process such as laminating the first layer 12 to the backing layer 18) rather than as a separate process. This is advantageous over other methods for forming microapertures 42, which can require separate steps (e.g., forming microapertures manually, via mechanical aperturing, using blowing agents, forming cells during extrusion, etc). Being able to form the microapertures 42 during manufacturing of the laminate 10 saves both time and money, and also can increase the range of materials usable for the top layer 12.

A microaperture 42 (also referred to as microhole, micropore, or microperforation), as used herein, is an aperture having a size that makes it large enough to permit moisture vapor to pass therethrough but small enough to prevent at least some liquids from passing therethrough. Generally, a microaperture will be of a size that makes it difficult to be seen by an unaided naked human eye. For example, in at least some embodiments of the invention, the microaperture has a size range of about 15-75 microns (micrometers) (e.g., about 0.6 to 3 mils).

Figure 17:
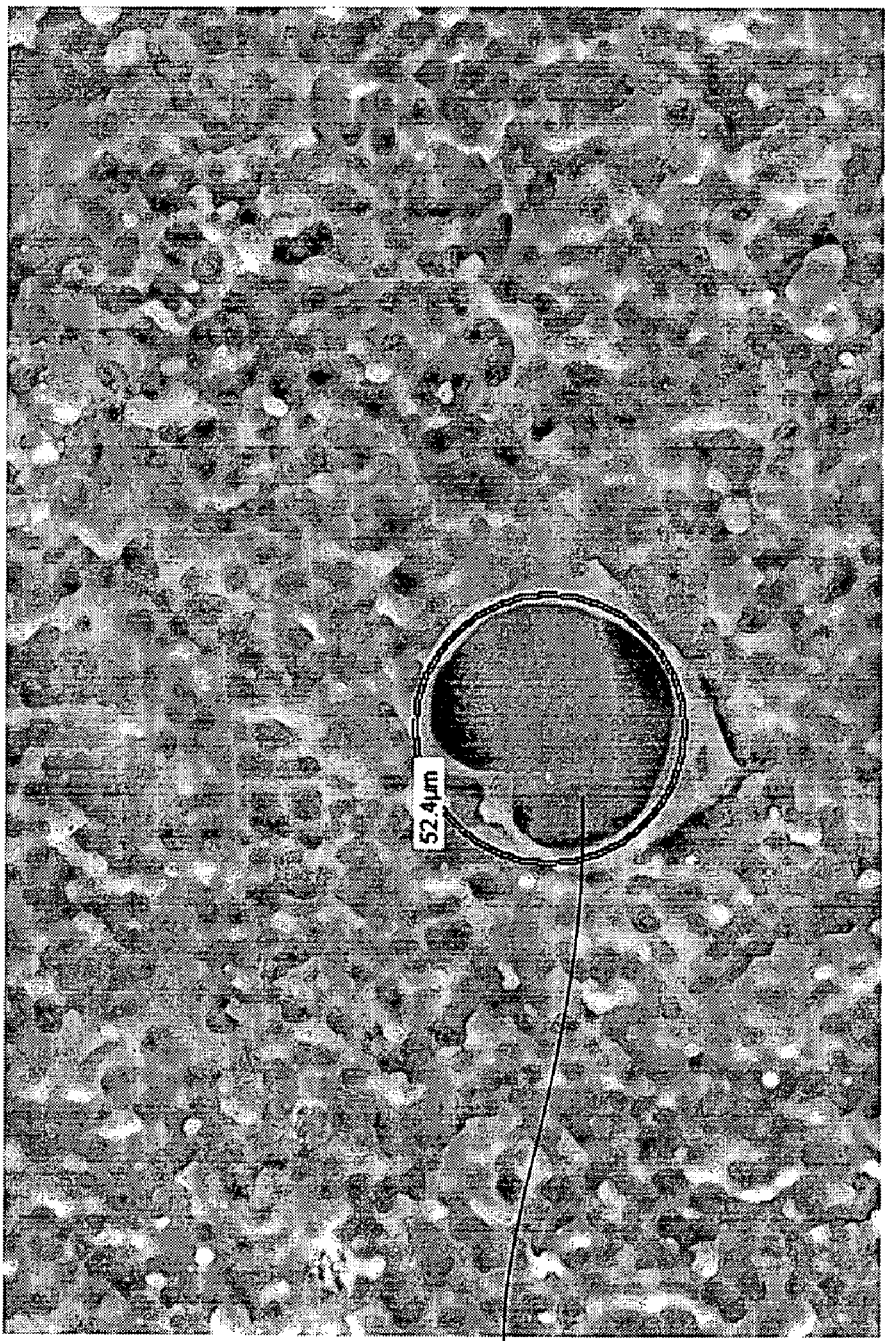
FIG. 17 is photograph showing a first enlarged top view, taken along a first portion of cross section E-E of FIG. 16, of an exemplary first one of the microapertures.

FIG. 17 is photograph showing an enlarged top view taken along a first portion of cross section E-E of FIG. 16, of an exemplary first one of the microapertures 42. The microaperture 42 of FIG. 16 has a diameter of approximately 52.4 microns and is shown enlarged five hundred (500) times. The microaperture 42 of FIG. 17 (along with the microapertures of FIGS. 18 and 19) was formed by the microprojections 40 projecting at least partially through the top layer 12 during application of heat and/or pressure to the top surface 13 of the top layer 12.

Figure 18:
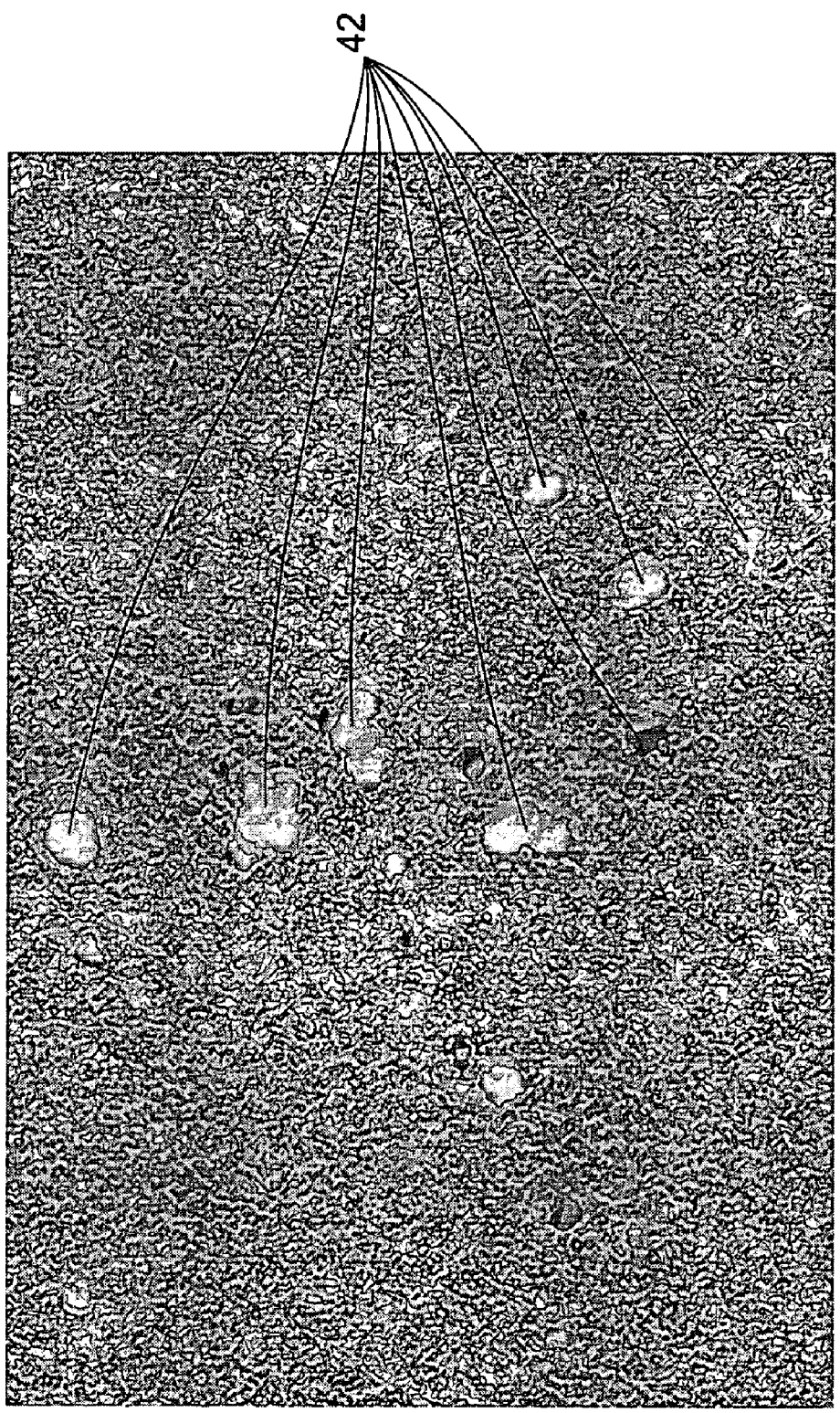
FIG. 18 is a photograph showing a second enlarged view, showing an exemplary plurality of microapertures.
Figure 19:
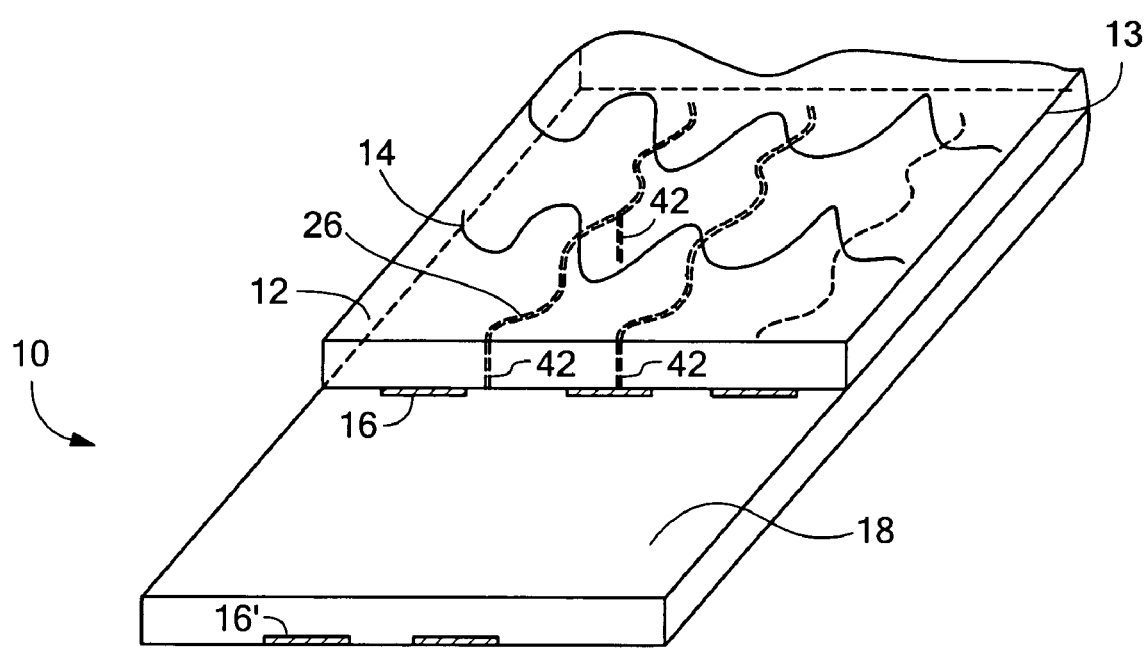
FIG. 19 is a perspective cut away view of the laminate of FIG. 15.

FIG. 18 is a photograph showing a second enlarged top view of the top layer 12 FIG. 16. FIG. 19, which was photographed at one hundred (100) times enlargement, shows a higher-level view than FIG. 17 and illustrates an exemplary plurality of microapertures 42 along the top side surface of upper layer 12.

The microaperture, when formed in one or more layers or thicknesses of material(s), need not have a uniform diameter throughout the thickness of material and need not penetrate entirely through the thickness of material, so long as the resulting microaperture permits moisture vapor to pass therethrough.

FIG. 19 is a perspective cut away view of the laminate 10 of FIG. 15 and illustrates examples of microapertures 42 that penetrate through at least a portion of the upper layer 12. Note that the shapes of microapertures 42 illustrated, photographed, and/or described herein are not limiting. The microaperture 42 can have virtually any shape (e.g., cylindrical, square, irregular, curved, oblong, etc.), and sizes, shapes, and locations illustrated for the microapertures shown in FIGS. 12-19 are illustrative and not limiting.

Referring to FIGS. 12-19, the top layer 12 has top and bottom sides and a plurality of microapertures 42 formed therein, where the plurality of microapertures 42 are formed after the top layer 12 is laminated to a backing layer 18 and after one or more variations 26 are formed on the top side 13 of the top layer. The backing layer 18 has top and bottom sides and is laminated along its top side to the bottom side of the top layer 12. The backing layer 18 is made from a substantially breathable material having a plurality of microprojections 40 projecting from its top side. During an application of heat and/or pressure to the top layer 12, at least a portion of the microprojections 40 penetrate at least partially through the top layer 12, to form a plurality of microapertures 42 in the top layer. The microapertures 42 penetrate at least a portion of the top layer 12 to a degree sufficient to improve breathability of the top layer 12 as compared to the breathability of the top layer 12 before the microapertures 42 are formed therein. Breathability can be improved by the quantity of the microapertures 42, the size of the microapertures 42, or both.

The top layer 12, in at least some embodiments, is made from a film that is essentially free of at least one of a plasticizer and a halogen. For example, the first material can be made from at least one of polyolefin; polylactide; aliphatic polyurethane; aromatic polyurethane; ether or ester and blends therein; polyurethane blended with ether or ester; poly ether block amide (PEBA); polyetheresteramide block copolymer; poly ether block amide (PEBA) blended with at least one of polyethylene, acid modified poly ethylene, maleic anhydride modified polyethylene, and polyethylene produced by a metallocene process; blends of the polyether block amide blends with the polyurethane blends; PEBA; a blend of PEBA with at least one of ethyl acrylic, methyl acrylic and ethyl methyl acrylic copolymers of acrylic acid and polyethylene; an olefin, including but not limited to ethylene, polyethylene, polypropylene, and polybutene; and copolymers and terpolymers of polypropylene, ethylene, or butene-1, (any of which could be acid modified and/or blended with PEBA).

The top layer 12 need not be breathable, although it can be. As with other embodiments described herein, usable materials for the top layer 12 include (but are not limited to) virtually all thermoplastics, including but not limited to cast, blown, molded, and oriented versions of materials such as polypropylene; copolymers and terpolymers of polypropylene; low density polyethylene; medium density polyethylene; linear low density polyethylene; metallocene polyethylene; high density polyethylene; polybutene-1; propylene; butene-1 multi-polymers; polyethylene terephthalate; polybutylene terephthalate; polycarbonate and related copolymers; polymethylacrylate and copolymers of methylacrylates; polyamide; nylons; polylactide; LEXAN (available from General Electric (GE) Plastics; Pittsfield; Mass.); polyacrylontrile butylene styrene; polyacetal; polystyrenes; ionomers; thermoplastic urethane; olefin; polyolefin; ethylene; ethylene vinyl acetate (EVA); ethylene acrylic acid copolymer (EAA); ethylene methylacrylic acid (EMA); 2-ethoxy ethyl methacrylate (EEMA); many types of acrylic acids (e.g.; methyl acrylic acid); copolymers of polypropylene; terpolymers of ethylene; polypropylene; polybutene; and butene-1; polylactide; and other polymers known to those skilled in the art. Theoretically, polymer materials that include halogens, such as polyvinyl chloride and polyvinylidene chloride, are also usable as the top layer 12, but in applications where being halogen-free is required, such halogen-containing materials preferably are avoided.

In addition, depending on the application, it is envisioned that the concepts and methods described herein will be applicable to virtually any material that needs to made more breathable, not just the materials listed above.

The number and/or size of microapertures 42 formed in the top layer 12 helps to determine the permeability of the top layer 12. For example, for a top layer made of aliphatic urethane, if there are fewer than 10 microapertures in a two-inch diameter area, the laminate 10 may have a perm of about 20. Note also that materials already having good breathability, such as PEBA, need not have microapertures (although adding microapertures can increase the perm of such materials). As another example, if there are 20-50 or more microapertures in a two-inch diameter area, the top layer 12 may have a perm of about 100. Even inherently breathable materials can achieve increased permeability by forming microapertures 42 with the microprojections 40. For example, testing has shown that a urethane top layer 12, by itself, has a perm of about 2-5, but with a plurality of microapertures formed therein, the perm of the urethane layer increases to around 100-150.

The backing layer 18 can be any breathable material having a plurality of microprojections projecting from at least a portion of the surface of the backing layer. For example, the backing-layer 18 can be a non-woven material such as non-calendered cellulose or cellulose-based material. Selection of certain materials for the backing layer 18 and/or additions of other application-specific layers to the laminate 10 can enable the laminate 10 to be adaptable for making many different materials breathable. For example, a release coating can be disposed between the bottom side of the top layer 12 and the top side of the backing layer 18, so that, before forming the variation 26, the backing layer 18 can be peeled away. In another example, a release coating can be disposed between the bottom side of the top layer 12 and the top side of the backing layer 18, so that microapertures 42 can be formed in the top layer 12 during formation of the variation 26, then, after the variation 26 is formed, the backing layer 18 can be "peeled away" to leave a breathable top layer 12. This can be useful for applications such as automotive interiors (e.g., seating materials), where it can be difficult to provide materials having desired breathability.

Figure 20:
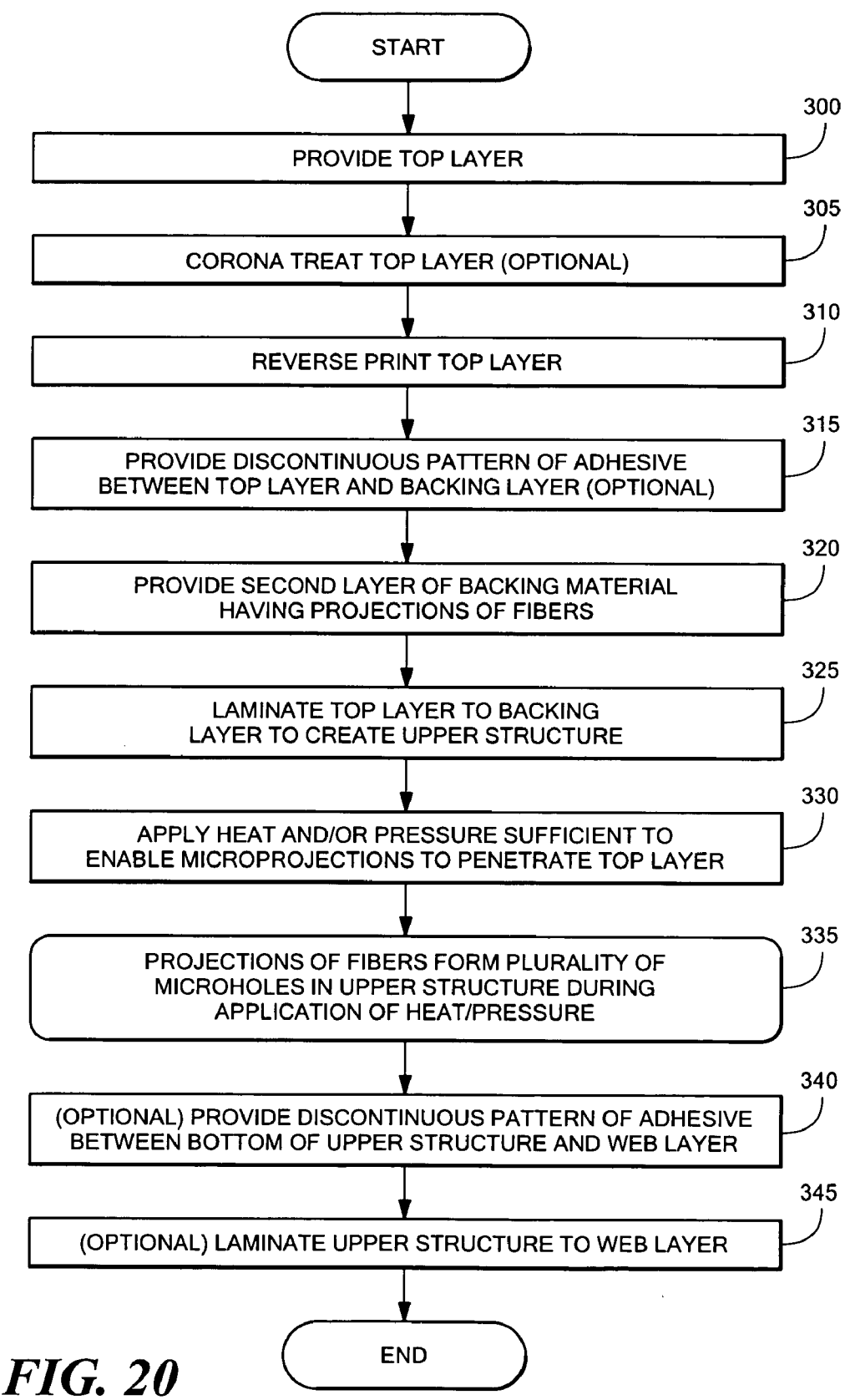
FIG. 20 is a flow chart of a method for making the laminate of FIG. 15.

FIG. 20 is a flow chart of a method of making the laminate 10 of FIG. 15. Referring to FIGS. 12-15, a top layer 12 is provided (block 300), the top layer having top and bottom sides. The top layer optionally can be corona treated (block 305), to enhance adhesion. The bottom side of the top layer 12 is reverse printed (using any of the aforementioned print methods) with print layer 14 (block 310), and a first adhesive layer 16 is provided, in a discontinuous pattern, between the top layer 12 and the top side of a backing layer 18 having top and bottom sides (block 315). Note that the block reciting use of a first adhesive layer 16 can, for at least some embodiments, be optional because, in at least one embodiment (see FIG. 11, described above) is possible to laminate the top layer 12 directly to the backing layer 18 without use of adhesive.

A backing layer 18 is provided, where the backing layer has projections of fibers (block 320). The top layer 12 is laminated to the backing layer 18 to create upper structure 24 (block 325). The backing layer 18 provides a background color to the reverse printed top layer 12. Heat and/or pressure are applied to the top layer 12 (block 330), and this can be done, for example, after the first layer of adhesive 16 cures. The heat and/or pressure is at a level sufficient to soften at least a portion of the top layer 12 enough to permit at least a portion of the plurality of microprojections 40 to form a plurality of microapertures in the top layer 12 (block 335), increasing the permeability of the top layer 12. The application of heat and/or pressure can also cause one or more variations 26 to be formed in the top surface 13 of the top layer 13. In at least some embodiments, the application of heat and/or pressure can be a separate action. However, for at least some other embodiments, the heat and/or pressure sufficient to create the microapertures (block 225) can occur during lamination, such as the lamination of the top layer to the backing layer (block 325) and/or the lamination of the upper structure 24 to an optional web layer 22 (block 345).

Forming the variation 26 provides a texturing to the top surface of the top layer 12, which also can increase the permeability of the top layer 12. Blocks 340 and 350 represent optional blocks that would be performed if a web layer 22 (as shown in FIGS. 1-2) were provided for the laminate 10 of FIG. 15. A second layer of adhesive 16' is provided in a discontinuous pattern between the bottom side of the backing layer 18 (i.e., the bottom of the upper structure 24) and the top side of a web layer 22 having top and bottom sides (block 240). The upper structure 24 is then laminated to the web layer 22 (block 345).

The embodiments of the invention described herein provide breathable laminated structures that provide at least some of the benefits of PVC and other halogen-containing structures, without the emission of harmful gases, cracking and other problems that can occur with use of PVC and halogen-containing structures. The embodiments described herein are especially advantageous in wallcovering applications, but, as described previously, are in no way limited to such applications.

In describing the embodiments of the invention illustrated in the figures, specific terminology (e.g., language, phrases, product brands names, etc.) is used for the sake of clarity. These names are provided by way of example only and are not limiting. The invention is not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, layers, elements, etc. Such terminology used herein, however, is for the purpose of description and not limitation.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention. In the Figures of this application, in some instances, a plurality of elements or blocks may be shown as illustrative of a particular element, or a single element or block may be shown as illustrative of a plurality of a particular element or block. It should be understood that showing a plurality of a particular element or block is not intended to imply that an article or manufacture or method implemented in accordance with the invention must comprise more than one of that element or block, nor is it intended by illustrating a single element or block that the invention is limited to embodiments having only a single one of that respective element or block. Those skilled in the art will recognize that the quantity of a particular element can be selected to accommodate the particular application or user needs. It will also be appreciated by those of ordinary skill in the art that unless otherwise indicated herein, the particular sequence of blocks in a given flow chart is illustrative only and can be varied without departing from the spirit and scope of the invention.

Having described and illustrated the principles of the technology with reference to specific implementations, it will be recognized that the technology can be implemented in many other, different, forms, and in many different environments. The technology disclosed herein can be used in combination with other technologies and can be modified to accommodate and/or comply with changes and improvements in the applicable technology and standards referred to herein. Variations, modifications, and other implementations of what is described herein can occur to those of ordinary skill in the art without departing from the spirit and the scope of the invention as claimed. Having described the preferred embodiments of the invention, it will now become apparent to one of ordinary skill in the art that other embodiments incorporating their concepts may be used. These embodiments should not be limited to the disclosed embodiments, but rather should be limited only by the spirit and scope of the appended claims.

The invention claimed is:

1. A breathable laminated article, comprising:
   a first layer of a first material, the first layer having first and second sides; and
   a second layer having first and second sides and comprising a substantially breathable material having a plurality of micro-projections along at least a portion of its first side, the second layer being laminated along its first side to the second side of the first layer;
   wherein the breathable laminated article has at least one variation formed in a surface of the first side of the first layer, the variation permitting at least a portion of the plurality of microprojections to penetrate at least a portion of the first layer enough to form a respective plurality of microapertures in at least a portion of the first layer.

2. The laminated article of claim 1, wherein the breathable laminated article has at least one of heat and pressure applied along at least a portion of the first side of the first layer, the at least one of heat and pressure softening the first layer enough to form the variation in the first side of the first layer.

3. The laminated article of claim 2, wherein the at least one of heat and pressure is applied during at least one of laminating, embossing, bead blasting, shot blasting, electro-discharge texturing, grinding, stamping, etching, laser machining, laser engraving, photochemical etching, and electron beam texturing.

4. The laminated article of claim 2, wherein the at least one of heat and pressure is provided when the second layer is laminated to the first layer.

5. The laminated article of claim 1, wherein the microprojections penetrate at least a portion of the first layer to a degree sufficient to improve the breathability of the first layer as compared to the breathability of the first layer before the micro apertures are formed therein.

6. The laminated article of claim 5, wherein the second material is selected such that at least one of the size and quantity of its microprojections increases the breathability of the first layer as compared to the breathability of the first layer before the microapertures are formed in the first layer.

7. The laminated article of claim 1, wherein the second material comprises a non-woven material comprising a plurality of fibers, at least some of which project from the second side to form the microprojections.

8. The laminated article of claim 1, wherein the first material comprises a film that is essentially free of at least one of a plasticizer and a halogen.

9. The laminated article of claim 8, wherein the first material comprises at least one of polyolefin; polylactide; aliphatic polyurethane; aromatic polyurethane; ether; polyurethane blended with ether or ester; poly ether block amide (PEBA); polyetheresteramide block copolymer; PEBA blended with at least one of polyethylene, acid modified poly ethylene, maleic anhydride modified polyethylene, polyurethane, and polyethylene produced by a metallocene process; a blend of PEBA with at least one of ethyl acrylic, methyl acrylic and ethyl methyl acrylic copolymers of acrylic acid and polyethylene; an olefin; ethylene; polyethylene; polypropylene; polybutene; copolymers of polypropylene, ethylene, or butene-1; and terpolymers of polypropylene, ethylene, or butene-1.

10. The laminated article of claim 1, wherein the first material comprises at least one of polypropylene; copolymers or terpolymers of polypropylene; low density polyethylene; medium density polyethylene; linear low density polyethylene; metallocene polyethylene; high density polyethylene; polybutene-1; propylene; butene-1 multi-polymers; polyethylene terephthalate; polybutylene terephthalate; polycarbonate or copolymers of polycarbonates; polymethylacrylate or copolymers of methylacrylates; polyamide; nylons; polylactide; LEXAN; polyacrylontrile butylene styrene; polyacetal; polystyrenes; ionomers; thermoplastic urethane; olefin; polyolefin; ethylene; ethylene vinyl acetate (EVA); ethylene acrylic acid copolymer (EAA); ethylene methylacrylic acid (EMA); ethyl methyl acrylic copolymers or acrylic acid or polyethylene; 2-ethoxy ethyl methacrylate (EEMA); acrylic acid; methyl acrylic acid; polypropylene; copolymers or terpolymers of ethylene, polypropylene, polybutene, or butene-1.

11. The laminated article of claim 1, further comprising a third layer disposed between the second side of the first layer and the first side of the second layer, the third layer comprising a printed pattern, wherein the printed pattern is printed such that it is either (a) reverse printed on the second side of the first layer or (b) printed on the first side of the second layer.

12. The laminated article of claim 11, wherein the first layer is sufficiently translucent to enable the printed pattern to be visible when viewed from the first side of the first layer.

13. The laminated article of claim 1, wherein the laminated article is constructed and arranged to be usable as a wallcovering.

14. The laminated article of claim 1, wherein the second layer is releasably laminated to the first layer so as to permit the second layer to be at least partially removable from the first layer.

15. The laminated article of claim 14, wherein the remaining first layer comprises a plurality of microapertures formed therein.

16. A laminated article, comprising:
a first layer comprising a breathable, substantially translucent, essentially halogen-free, and essentially plasticizer-free material, the first layer having first and second sides, the first side of the first layer having at least one variation formed in a surface of the first side of the first layer;
a second layer laminated to the second side of the first layer, the second layer comprising a substantially opaque, breathable, non-woven material having first and second sides;
a printed pattern layer coupled to the first layer, and
a protective coating coupled to the printed pattern layer.

17. The laminated article of claim 16, wherein the printed pattern layer is either reverse printed on the second side of the first layer or printed on the first side of the second layer.

18. The laminated article of claim 17, wherein if the printed pattern layer is printed on the first side of the second layer, the laminated article further comprises a protective coating applied over at least a portion of the printed pattern layer.

19. The laminated article of claim 16, further comprising another layer disposed between the second side of the first layer and the first side of the second layer, the another layer comprising an adhesive.

20. The laminated article of claim 19, wherein the adhesive is applied in a discontinuous pattern.

21. The laminated article of claim 16, further comprising another layer laminated to the second side of the second layer, the another layer having first and second sides, the first side of the another layer being coupled to the second side of the second layer, the another layer comprising a web material.

22. The laminated article of claim 16, wherein the first layer comprises at least one of polyetheresteramide block copolymer, poly ether block amide (PEBA), and a urethane.

23. The laminated article of claim 16, wherein the variation is formed by at least one of laminating, embossing, bead blasting, shot blasting, electro-discharge texturing, grinding, stamping, etching, laser machining, laser engraving, photo-chemical etching, and electron beam texturing.

24. The laminated article of claim 22, wherein the laminated article is embossed along the first side of the first layer.

25. The laminated article of claim 16, wherein the first layer comprises at least one of aliphatic polyurethane; aromatic polyurethane; polylactide; ether; ester; polyurethane blended with ether or ester; poly ether block amide (PEBA); polyetheresteramide block copolymer; PEBA blended with at least one of polyethylene, acid modified poly ethylene, maleic anhydride modified polyethylene, polyurethane, and polyethylene produced by a metallocene process; a blend of PEBA with at least one of ethyl acrylic, methyl acrylic, and ethyl methyl acrylic copolymers of acrylic acid and polyethylene; an olefin; ethylene; polyethylene; polypropylene; polybutene; polyolefin; ethylene vinyl acetate (EVA); ethylene acrylic acid copolymer (EAA); ethylene methylacrylic acid (EMA); ethyl methyl acrylic copolymers of acrylic acid or polyethylene; 2-ethoxy ethyl methacrylate (EEMA); acrylic acid; methyl acrylic acid; and copolymers and terpolymers of polypropylene, ethylene, or butene-1.

26. The laminated article of claim 16, wherein the first layer comprises 20-100% by weight of at least one of polyetheresteramide block copolymer and poly ether block amide (PEBA).

27. The laminated article of claim 16, wherein the first layer further comprises maleic acid polyethylene modified copolymer.

28. The laminated article of claim 16, wherein the second layer comprises reinforced cellulose.

29. The laminated article of claim 19, wherein the adhesive layer further comprises at least one of a fungicide and a fire-retarding chemical.

30. The laminated article of claim 16, wherein the article is constructed and arranged to be usable as a breathable wallcovering.

31. The laminated article of claim 10, further comprising:
a printed pattern layer coupled to the first layer.

32. The laminated article of claim 10, wherein the first layer is corona treated.

33. The laminated article of claim 10, wherein the second layer comprises polyester.

34. The laminated article of claim 16, wherein the first layer is corona treated.

35. The laminated article of claim 16, wherein the second layer comprises polyester.

36. The laminated article of claim 33, further comprising:
a printed pattern layer coupled to the first layer.

37. The laminated article of claim 36, wherein the first layer is corona treated.

38. The laminated article of claim 36, further comprising:
a protective coating coupled to the printed pattern layer.

39. The laminated article of claim 31, further comprising:
a protective coating coupled to the printed pattern layer.

40. The laminated article of claim 16, further comprising:
an adhesive-containing layer disposed between the first layer and the second layer.

41. The laminated article of claim 16, wherein the first layer further comprises at least one of an ethylene acrylic acid copolymer and ethyl methyl acrylate ethylene copolymer.

42. The laminated article of claim 1, wherein the first layer comprises a fire retarding chemical containing halogens.

43. A laminated article, comprising:
a first layer comprising a breathable, substantially translucent, essentially halogen-free, and essentially plasticizer-free material, the first layer having first and second sides;
a second layer laminated to the second side of the first layer, the second layer comprising a substantially opaque, breathable, non-woven material having first and second sides; and
a printed pattern layer coupled to the first layer, the printed pattern layer being either reverse printed on the second side of the first layer or printed on the first side of the second layer.

44. The laminated article of claim 43, wherein the printed pattern layer is printed on the first side of the second layer, the laminated article further comprises a protective coating applied over at least a portion of the printed pattern layer.

45. A laminated article, comprising:
a first layer comprising a breathable, substantially translucent, essentially halogen-free, and essentially plasticizer-free material, the first layer having first and second sides, the first layer further comprising maleic acid polyethylene modified copolymer;

a second layer laminated to the second side of the first layer, the second layer comprising a substantially opaque, breathable, non-woven material having first and second sides; and a printed pattern layer coupled to the first layer.

46. A laminated article, comprising:

a first layer comprising a breathable, substantially translucent, essentially halogen-free, and essentially plasticizer-free material, the first layer having first and second sides;

a second layer laminated to the second side of the first layer, the second layer comprising a substantially opaque, breathable, non-woven material having first and second sides;

a printed pattern layer coupled to the first layer; and an adhesive-containing layer disposed between the second side of the first layer and the first side of the second layer, the adhesive-containing layer comprising at least one of a fungicide and a fire-retarding chemical.

47. The laminated article of claim 16, wherein the first layer further comprises at least one of a polyetheresteramide block copolymer, a poly ether block amide (PEBA), and a urethane.

* * * * *